US012650989B2

(12) United States Patent
Yang et al.

(10) Patent No.: US 12,650,989 B2
(45) Date of Patent: Jun. 9, 2026

(54) METHOD, DEVICE AND STORAGE MEDIUM FOR PROCESSING DATA TABLE

(71) Applicant: Beijing Volcano Engine Technology Co., Ltd., Beijing (CN)

(72) Inventors: Yemeng Yang, Beijing (CN); Heng Chen, Beijing (CN); Rui Shi, Beijing (CN); Jianjun Chen, Los Angeles, CA (US)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/734,974

(22) Filed: Jun. 5, 2024

(65) Prior Publication Data

US 2024/0419669 A1 Dec. 19, 2024

(30) Foreign Application Priority Data

Jun. 19, 2023 (CN) .......................... 202310731051.0

(51) Int. Cl.
*G06F 16/2455* (2019.01)
*G06F 16/22* (2019.01)
(52) U.S. Cl.
CPC ...... *G06F 16/2456* (2019.01); *G06F 16/2255* (2019.01)
(58) Field of Classification Search
None
See application file for complete search history.

(56) References Cited

U.S. PATENT DOCUMENTS

| | | | | |
|---|---|---|---|---|
| 7,203,686 B1 * | 4/2007 | Sinclair | ............... | G06F 16/2456 |
| 2005/0027724 A1 * | 2/2005 | Minamino | ........... | G06F 16/289 |
| 2009/0119247 A1 * | 5/2009 | Bellamkonda | ...... | G06F 16/2456 |

(Continued)

FOREIGN PATENT DOCUMENTS

| | | | | |
|---|---|---|---|---|
| CN | 102197395 A | 9/2011 | | |
| CN | 105183880 A | * 12/2015 | ........... | G06F 3/0608 |
| CN | 106021386 B | 2/2019 | | |
| CN | 110807030 A | 2/2020 | | |
| CN | 113535719 A | 10/2021 | | |
| CN | 115062027 A | 9/2022 | | |

(Continued)

OTHER PUBLICATIONS

Liu Y, Grigoryan G, Li J, Sun G, Tauber T. VeriTable: Fast equivalence verification of multiple large forwarding tables. Computer Networks. Feb. 26, 2020;168:106981. (Year: 2020).*

(Continued)

*Primary Examiner* — Uyen T Le
(74) *Attorney, Agent, or Firm* — Astute IP Law Group

(57) ABSTRACT

There are provided a method, device, and storage medium for processing a data table. The method includes: performing an equivalent join on a left table and a right table in two data tables that are to be joined by a hash join, and acquiring first associated data of an association between the left table and the right table; filtering the first associated data according to a predetermined non-equivalent filtering condition, and determining second associated data satisfying the predetermined non-equivalent filtering condition in the first associated data; identifying, in a predetermined data structure according to a target join type of the two data tables; and processing the left table and/or the right table according to the target join type of the two data tables and the predetermined data structure to generate a target join table.

20 Claims, 3 Drawing Sheets

(56) References Cited

U.S. PATENT DOCUMENTS

| | | | | |
|---|---|---|---|---|
| 2010/0082648 | A1 | 4/2010 | Potapov et al. | |
| 2014/0214794 | A1* | 7/2014 | Attaluri | G06F 16/278 |
| | | | | 707/714 |
| 2014/0280024 | A1* | 9/2014 | Baskett | G06F 16/24544 |
| | | | | 707/714 |
| 2017/0255675 | A1* | 9/2017 | Chavan | G06F 16/24562 |
| 2020/0201860 | A1* | 6/2020 | Vogelsgesang | G06F 16/24537 |

FOREIGN PATENT DOCUMENTS

| | | | | | |
|---|---|---|---|---|---|
| CN | 115374142 | A | | 11/2022 | |
| CN | 115630071 | A | | 1/2023 | |
| CN | 115858580 | A | | 3/2023 | |
| CN | 116108074 | A | | 5/2023 | |
| CN | 116775652 | A | * | 9/2023 | |
| WO | WO-2018052508 | A1 | * | 3/2018 | G06F 16/221 |
| WO | WO-2019056964 | A1 | * | 3/2019 | G06F 16/2282 |

OTHER PUBLICATIONS

Hamdi M, Yu F, Alswedani S. An efficient data structure for fast join query processing. In IEEE Technically sponsored future technologies conference (FTC) 2017 (pp. 483-492). (Year: 2017).*

Fender, Pit, and Guido Moerkotte. "Counter strike: Generic top-down join enumeration for hypergraphs." Proceedings of the VLDB Endowment 6.14 (2013): 1822-1833. (Year: 2013).*

Gupta, Bhanu Pratap, Devang Vira, and S. Sudarshan. "X-data: Generating test data for killing SQL mutants." 2010 IEEE 26th International Conference on Data Engineering (ICDE 2010). IEEE, 2010. (Year: 2010).*

Hemalatha, Ms G. "A Survey on Join Techniques." (2010).6 pages Annual International Conference on Advances in Distributed and Parallel Computing (ADPC 2010) Copyright © GSTF 2010 ISBN: 978-981-08-7656-2 doi:10.5176/978-981-08-7656-2 A-41 (Year: 2010).*

Extended European Search Report for European Patent Application No. 24180022.6, mailed on Oct. 25, 2024, 7 pages.

Wu et al., "FactorJoin: A New Cardinality Estimation Framework for Join Queries", arxiv.org, Cornell University Library, 201 OLIN Library Cornell University Ithaca, NY 14853, Dec. 11, 2022, 19 pages.

Office Action for Chinese Patent Application No. 202310731051.0, mailed on Jun. 5, 2025, 15 pages.

Office Action for Chinese Patent Application No. 202310731051.0, mailed on Feb. 11, 2026, 8 pages.

Yazhuo Zhang, "The Optimization of Hash Join Algorithm based on Knl", A Dissertation Submitted for the Degree of Master, Apr. 26, 2020, 78 pages, with English Abstract.

* cited by examiner

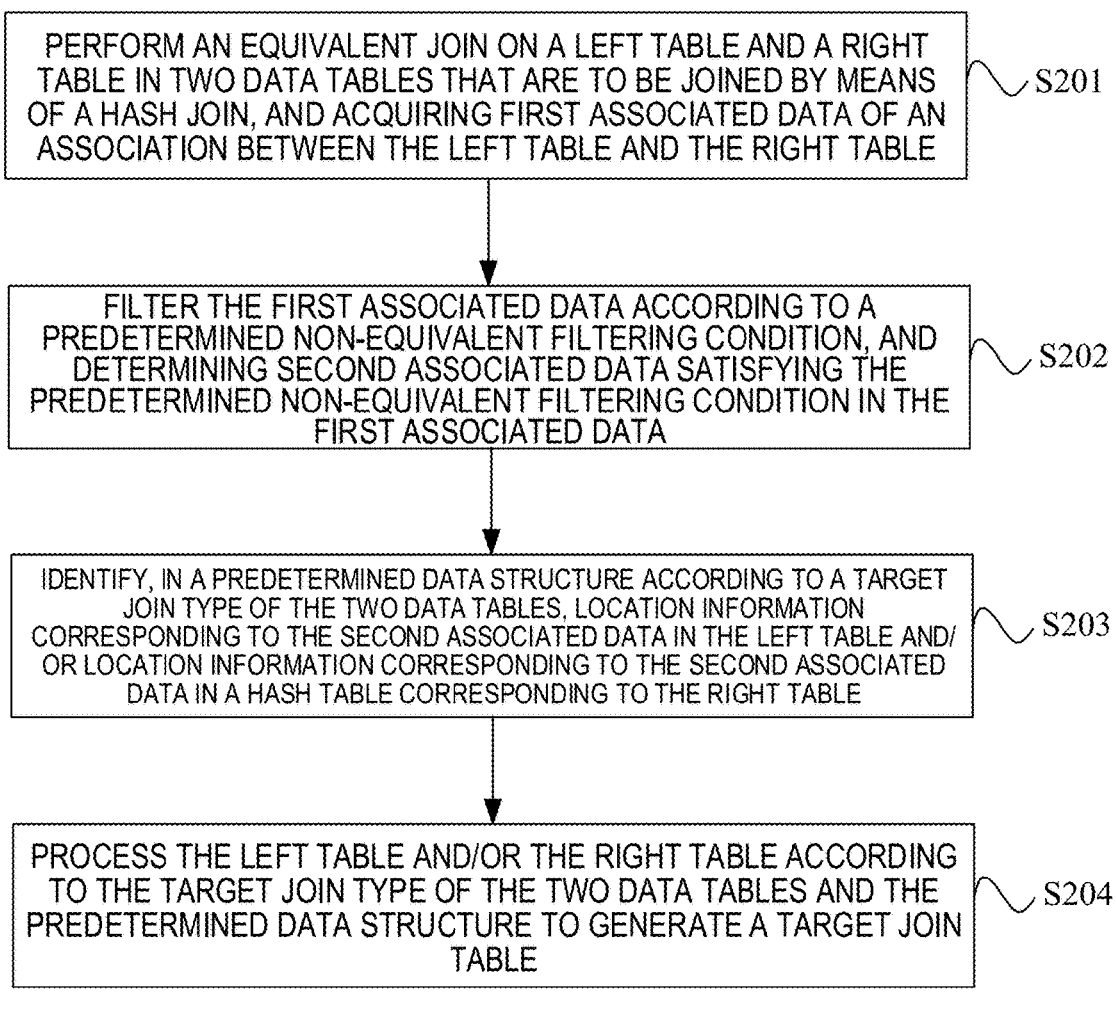

PERFORM AN EQUIVALENT JOIN ON A LEFT TABLE AND A RIGHT TABLE IN TWO DATA TABLES THAT ARE TO BE JOINED BY MEANS OF A HASH JOIN, AND ACQUIRING FIRST ASSOCIATED DATA OF AN ASSOCIATION BETWEEN THE LEFT TABLE AND THE RIGHT TABLE — S201

FILTER THE FIRST ASSOCIATED DATA ACCORDING TO A PREDETERMINED NON-EQUIVALENT FILTERING CONDITION, AND DETERMINING SECOND ASSOCIATED DATA SATISFYING THE PREDETERMINED NON-EQUIVALENT FILTERING CONDITION IN THE FIRST ASSOCIATED DATA — S202

IDENTIFY, IN A PREDETERMINED DATA STRUCTURE ACCORDING TO A TARGET JOIN TYPE OF THE TWO DATA TABLES, LOCATION INFORMATION CORRESPONDING TO THE SECOND ASSOCIATED DATA IN THE LEFT TABLE AND/ OR LOCATION INFORMATION CORRESPONDING TO THE SECOND ASSOCIATED DATA IN A HASH TABLE CORRESPONDING TO THE RIGHT TABLE — S203

PROCESS THE LEFT TABLE AND/OR THE RIGHT TABLE ACCORDING TO THE TARGET JOIN TYPE OF THE TWO DATA TABLES AND THE PREDETERMINED DATA STRUCTURE TO GENERATE A TARGET JOIN TABLE — S204

FIG. 2

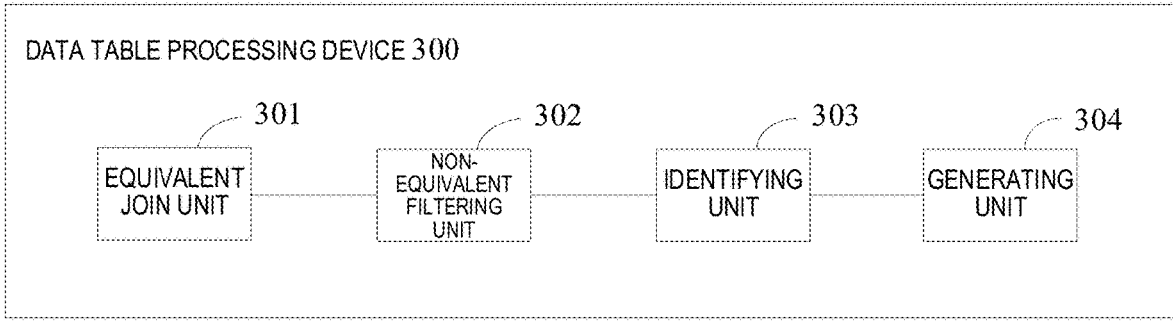

DATA TABLE PROCESSING DEVICE 300

301 — EQUIVALENT JOIN UNIT

302 — NON-EQUIVALENT FILTERING UNIT

303 — IDENTIFYING UNIT

304 — GENERATING UNIT

FIG. 3

METHOD, DEVICE AND STORAGE MEDIUM FOR PROCESSING DATA TABLE

CROSS-REFERENCE

This application claims priority to Chinese Patent Application No. 202310731051.0 filed on Jun. 19, 2023, and entitled "METHOD, DEVICE AND STORAGE MEDIUM FOR PROCESSING DATA TABLE".

FIELD

Embodiments of the present disclosure relate to the field of computer and network communications technologies, and in particular, to a method, device, and storage medium for processing a data table.

BACKGROUND

A join operation of a data table refers to an operation of combining two data tables having a certain association relationship into a data table, and associated and unassociated data are processed by different means. Therefore, the join operation of the data table may be subdivided into different join types, including a Cross Join, an Inner Join, an Outer Join, a Full Join, a Half Join, and an Anti Join.

However, in the prior art, a join operation on a data table based on an equivalent join condition is relatively easy to be implemented, while a non-equivalent join condition is relatively complex, and a combination of the equivalent join condition and the non-equivalent join condition is more complex. In the prior art, the combination of the equivalent join condition and the non-equivalent join condition of different join types cannot be supported.

SUMMARY

Embodiments of the present disclosure provide a method, device and a storage medium for process a data table, so as to provide a new data table join manner.

In a first aspect of the present disclosure, embodiments of the disclosure provide a method for processing a data table. The method comprises:

performing an equivalent join on a left table and a right table in two data tables that are to be joined by means of a hash join, and acquiring first associated data of an association between the left table and the right table;

filtering the first associated data according to a predetermined non-equivalent filtering condition, and determining second associated data satisfying the predetermined non-equivalent filtering condition in the first associated data;

identifying, in a predetermined data structure according to a target join type of the two data tables, location information corresponding to the second associated data in the left table and/or location information corresponding to the second associated data in a hash table corresponding to the right table;

processing the left table and/or the right table according to the target join type of the two data tables and the predetermined data structure to generate a target join table.

In a second aspect of the present disclosure, embodiments of the disclosure provide a device for processing a data table. The device comprises:

an equivalent join unit, configured to perform an equivalent join on a left table and a right table in two data tables that are to be joined by means of a hash join, and acquire first associated data of an association between the left table and the right table;

a non-equivalent filtering unit, configured to filter the first associated data according to a predetermined non-equivalent filtering condition, and determine second associated data satisfying the predetermined non-equivalent filtering condition in the first associated data;

an identifying unit, configured to identify, in a predetermined data structure according to a target join type of the two data tables, location information corresponding to the second associated data in the left table and/or location information corresponding to the second associated data in a hash table corresponding to the right table; and a generating unit, configured to process the left table and/or the right table according to the target join type of the two data tables and the predetermined data structure to generate a target join table.

In a third aspect of the present disclosure, embodiments of the disclosure provide an electronic device. The electronic device comprises: at least one processing unit and a memory;

the memory storing computer executable instructions;

the at least one processing unit executing the computer executable instructions that are stored by the memory and causing the electronic device to perform methods for processing a data table according to the first aspect and various possible designs of the first aspect.

In a fourth aspect of the present disclosure, embodiments of the disclosure provide a computer readable storage medium, having a computer program stored thereon, the computer program, when executed by a processor, performing methods for processing a data table according to the first aspect and various possible designs of the first aspect.

In a fifth aspect of the present disclosure, embodiments of the disclosure provide a computer program product, having a computer program stored thereon, the computer program, when executed by a processor, performing methods for processing a data table according to the first aspect and various possible designs of the first aspect.

Embodiments of the disclosure provide a method, device, and storage medium for processing a data table. An equivalent join is performed on a left table and a right table in two data tables that are to be joined by means of a hash join, and first associated data of an association between the left table and the right table is acquired; the first associated data is filtered according to a predetermined non-equivalent filtering condition, and second associated data satisfying the predetermined non-equivalent filtering condition is determined in the first associated data; location information corresponding to the second associated data in the left table and/or location information corresponding to the second associated data in a hash table corresponding to the right table are identified in a predetermined data structure according to a target join type of the two data tables; and the left table and/or the right table are processed according to the target join type of the two data tables and the predetermined data structure to generate a target join table. With assistance of the predetermined data structure, a non-equivalent join can be realized on a basis of the hash join, different target join types are supported, and processing efficiency is high.

BRIEF DESCRIPTION OF THE DRAWINGS

In order to describe the technical solutions in the embodiments of the present disclosure or in the art more clearly, the following briefly introduces the drawings required for describing the embodiments or the prior art. Clearly, the drawings as described below show some embodiments of the present disclosure, and other drawings may also be obtained according to these drawings without creative efforts.

FIG. 2 shows a flowchart of a method for processing a data table according to an embodiment of the present disclosure;

FIG. 3 shows a block diagram of a data table processing device according to an embodiment of the present disclosure.

DETAILED DESCRIPTION

Figure 1:
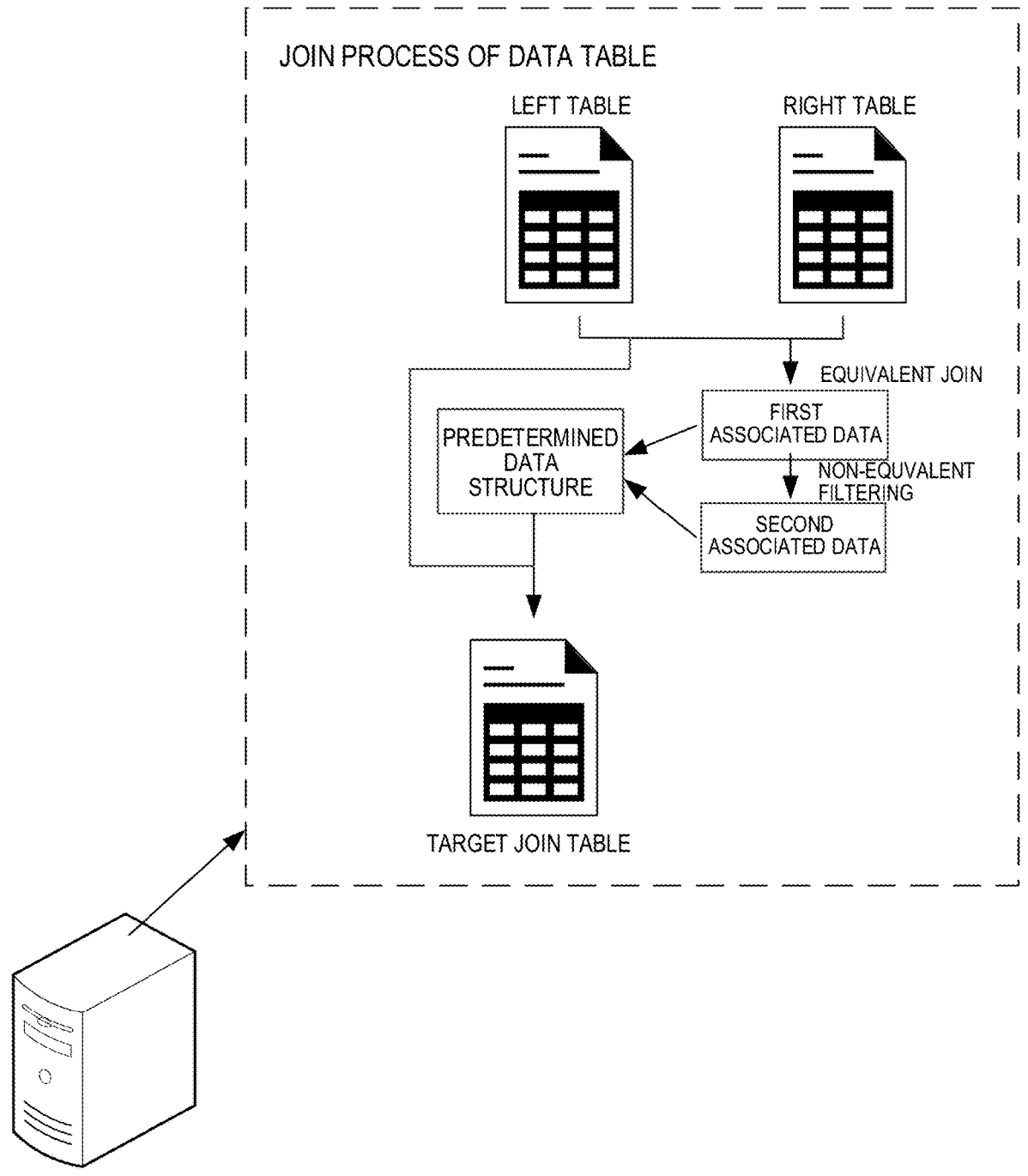
FIG. 1 shows a schematic diagram of an example environment in which a method for processing a data table according to an embodiment of the present disclosure may be applied.

In order to make objectives, technical solutions and advantages of the embodiments of the present disclosure more apparent, reference will be made to drawings in the embodiments of the present disclosure to describe the technical solutions in the embodiments of the present disclosure in a clearly and fully understandable way. Clearly, the described embodiments are only a part but not all of the embodiments of the present disclosure. All other embodiments, obtained by those skilled in the art based on the embodiments of the present disclosure without creative efforts, belong to the protection scope of the present disclosure.

First, definitions of different join types of a data table join are introduced. A join operation refers to an operation of combining two tables having a certain association relationship into one table, which is generally performed under one or more association conditions to indicate a relationship between the two tables, and finally an associated result is returned. For different processing means of associated and unassociated data, the join operation is subdivided into several different types.

1) Cross Join: a Cartesian product is performed on the two tables and there is no association relationship between the two tables.

2) Inner Join: only data in the two data tables which is associated is eventually returned.

3) Outer Join: on a basis of Inner Join, for data in one of the data tables that is not associated, the data may be added when returning, and the other data table is supplemented with NULL. Supplementing a right table with NULL is referred to as Left Outer Join, and supplementing a left table with NULL is referred to as Right Outer Join.

4) Full Join: similar to Outer Join, for data in the two data tables that is not associated, the data may be added when returning.

5) Semi Join: only data in one data table that is associated is returned, and only one result is return if one piece of data is associated with a plurality of pieces of data. The return of data in the left table that is associated is referred to as Left Semi Join, and the return of data in the right table that is associated is referred to as Right Anti Join.

6) Anti Join: in contrast to Semi Join, only data in one data table that is not associated is returned. The return of data in the left table that is not associated is referred to as Left Semi Join, and the return of data in the right table that is not associated is referred to as Right Anti Join.

In a join scenario of two data tables, a common practice in the prior art is to establish a hash table for a right table, and then match data in the left table with the Hash table row by row, and this method is also called Hash Join. However, this method has a disadvantage, it only supports an equivalent association condition, for example, table1. col=table2. col; but it cannot support a non-equivalent association condition, for example, table1. col>table2. col. The hash table cannot establish an association based on the non-equivalent condition. For other association conditions that differ from the equivalent association condition, it is usually called as a non-equivalent association or "Other Conjuncts", especially a combination of the equivalent association and the non-equivalent association.

In a standard SQL specification, because there are many join types, such as Full Join, Inner Join, Left Outer Join, Right Outer Join, and Left Semi Join, each join type has different processing means for associated and unassociated data, which increases the difficulty of implementing the non-equivalent association and the combination of the non-equivalent association.

Supporting the non-equivalent association in Join is a difficult problem, and many computing engines still do not implement a non-equivalent association function. A simplest implementation is do not to use Hash Join any more but degrading it to Cross Join, i.e., first perform Cartesian product on the two tables that are to be joined to obtain all results, and then filter all the results by using an association condition to return final results. This method generally has high complexity and poor performance.

Another common implementation is to first establish an association relationship between two tables by using an equivalent condition, and then perform filtering on the associated data under a non-equivalent association condition to obtain the associated data. However, this method is generally applicable to only Inner Join, and cannot be applied to all Join types, and has no universality.

In order to solve the above-mentioned technical problem, the present disclosure provides a method for processing a data table based on assistance of a predetermined data structure, so that the non-equivalent join can be realized on a basis of the Hash Join, different target join types are supported, and location information corresponding to the data, on which the equivalent join and the non-equivalent join are performed, in the left table and/or location information corresponding to the data in the right table are identified by the predetermined data structure. Thus, for different target join types, data may be acquired based on the predetermined data structure to generate a target join table.

The method for processing a data table provided in the present disclosure can be applied to an electronic device such as a terminal device or a server. As an example, the method for processing a data table is applied to a server. As shown in FIG. 1, the server can perform an equivalent join on a left table and a right table in two data tables that are to be joined by means of a Hash Join, and acquire first associated data of an association between the left table and the right table; filter the first associated data according to a predetermined non-equivalent filtering condition, and determine second associated data satisfying the predetermined non-equivalent filtering condition in the first associated data; identify, in a predetermined data structure according to a target join type of the two data tables, location information corresponding to the second associated data in the left table and/or location information corresponding to the second associated data in a hash table corresponding to the right table; and process the left table and/or the right table according to the target join type of the two data tables and the predetermined data structure to generate a target join table.

The method for processing a data table of the present disclosure will be described in detail below with reference to specific embodiments.

Referring to FIG. 2, FIG. 2 shows a schematic flowchart of a method for processing a data table according to an embodiment of the present disclosure. The method in the embodiment may be applied to an electronic device such as a terminal device or a server. The method for processing a data table includes the following.

S201, performing an equivalent join on a left table and a right table in two data tables that are to be joined by means of a Hash Join, and acquiring first associated data of an association between the left table and the right table.

In this embodiment, the two data tables that are to be joined include a left table and a right table, and a hash table is obtained based on the right table. That is, calculating a hash value for a key designated by the right table by using a hash function, mapping the key and a corresponding value to a position corresponding to the hash value to obtain the hash table. The hash table is a hash table acquired for the entire right table, and the left table needs to be matched with the hash table. Therefore, a data table with a small data amount (the number of data rows) in the two data tables that are to be joined may be used as the right table, so as to prevent the hash table from occupying a large amount of memory, and prevent the Hash Join from consuming too many computing resources.

Further, based on the hash table corresponding to the right table, a Hash Join is used to perform an equivalent join on the left table and the right table. That is, a hash function is used to calculate a hash value of a key of data in the left table row by row, and the hash table is searched according to the hash value, so that the equivalent join between the left table and the right table are realized based on the key, and first associated data of an association (with the same key) between the left table and the right table is determined. The specific process of the Hash Join is not described herein again.

S202, filtering the first associated data according to a predetermined non-equivalent filtering condition, and determining second associated data satisfying the predetermined non-equivalent filtering condition in the first associated data.

In this embodiment, on a basis of the first associated data obtained through the equivalent join, the first associated data is filtered according to a predetermined non-equivalent filtering condition. A non-equivalent filtering is applied to a value in the first associated data, and certainly may also be applied to the above-mentioned key. Taking a value in the first associated data as an example, the predetermined non-equivalent filtering condition may be that the value is greater than a predetermined threshold, or the value is less than a predetermined threshold value, or the value is not equal to the predetermined value, etc., and then second associated data satisfying the predetermined non-equivalent filtering condition can be filtered out from the first associated data based on the predetermined non-equivalent filtering condition.

S203, identifying, in a predetermined data structure according to a target join type of the two data tables, location information corresponding to the second associated data in the left table and/or location information corresponding to the second associated data in a hash table corresponding to the right table.

In this embodiment, in an equivalent join and a non-equivalent join filtering process, a predetermined data structure may be used according to target join types of the two data tables to identify location information corresponding to second associated data in the left table, and/or location information corresponding to second associated data in a hash table corresponding to the right table. If the target join type is a join type related to the left table, for example, a Left Outer Join, a Left Anti Join, and a Left Half Join, a predetermined data structure needs to be used to identify location information corresponding to the second associated data in the left table, and location information corresponding to the second associated data in the hash table corresponding to the right table may not be identified. If the target join type is a join type related to the right table, for example, a Right Outer Join, a Right Anti Join, and a Right Half Join, a predetermined data structure needs to be used to identify the location information of the second associated data in the hash table corresponding to the right table, and the location information of the second associated data in the left table does not need to be identified. If the target join type is a join type related to both of the left table and the right table, for example, a full join, location information corresponding to the second associated data in the left table and location information corresponding to the second associated data in the hash table corresponding to the right table need to be identified in the predetermined data structure at the same time.

S204, processing the left table and/or the right table according to the target join type of the two data tables and the predetermined data structure to generate a target join table.

In this embodiment, for different target join types of the two data tables, the data required for generating a final target join table is different. The required data can be determined from a left table and/or a right table with the assistance of a predetermined data structure, and then the target join table is generated based on these data. For example, in a case that the target join type is a full join, on a basis of determining the second associated data, the data that is to be supplemented in the left table and the data that is to be supplemented in the right table can be determined based on the predetermined data structure, and then the target join table is generated based on the second associated data, the data that is to be supplemented in the left table and the data that is to be supplemented in the right table. Further, in a case that the target join type is a Left Anti Join, data in the left table other than the second associated data may be determined according to the predetermined data structure, and then the target join table is generated according to the data in the left table other than the second associated data. Further, in a case that the target join type is a Right Anti Join, data in the right table other than the second associated data may be determined according to the predetermined data structure, and then the target join table is generated according to the data in the right table other than the second associated data, and so on, and other cases are not described herein one by one.

It should be noted that, the two data tables in this embodiment may be data tables in a columnar storage engine, and correspondingly, the predetermined data structure is also stored in the columnar storage engine by means of the columnar storage, so as to facilitate quick query and improve generation efficiency of the target join table.

Embodiments of the disclosure provide a method for processing a data table, an equivalent join is performed on a left table and a right table in two data tables that are to be joined by means of a Hash Join, and first associated data of an association between the left table and the right table is acquired; the first associated data is filtered according to a predetermined non-equivalent filtering condition, and second associated data satisfying the predetermined non-equivalent filtering condition in the first associated data is determined; location information corresponding to the second associated data in the left table and/or location information corresponding to the second associated data in a hash table corresponding to the right table are identified in a predetermined data structure according to a target join type of the two data tables; and the left table and/or the right table are processed according to the target join type of the two data tables and the predetermined data structure to generate a target join table. With assistance of the predetermined data structure, a non-equivalent join can be realized on a basis of the Hash Join, different target join types are supported, and processing efficiency is high.

On the basis of any of the above-mentioned embodiments, in a case that the target join type is a full join, a Right Outer Join, a Right Anti Join, a Right Half Join, or the like, a predetermined data structure needs to be used to identify location information corresponding to the second associated data in the hash table corresponding to the right table. In this embodiment, usage state information of each piece of data in the right table may be maintained by using a data structure corresponding to the hash table, that is, usage state information about respective elements comprised in respective offset positions of the hash table. Here, each offset position of the hash table represents a position corresponding to respective hash value in the hash table. Since a right table may have a plurality of values corresponding to one key, a plurality of elements may be comprised at one offset position of the hash table, so as to correspond to different rows of data of a same key in the right table, where one of the elements may be a pointer to a row of data.

By the data structure corresponding to the hash table in this embodiment, all rows corresponding to each key in the hash table corresponding to the right table are mapped to a one-dimensional array, each row of data in the right table corresponds to an element in the array, and the array stores information about whether a row of data is used. All the usage state information in the data structure corresponding to the hash table may be initialized to "unused", and if a certain row of data is used in a subsequent process, the corresponding usage state information is modified.

Further, after identifying, in the predetermined data structure, the location information corresponding to the second associated data in the hash table corresponding to the right table, the usage state information of the element corresponding to the second associated data may be modified in the data structure corresponding to the hash table according to the location information corresponding to the second associated data in the hash table corresponding to the right table.

In this embodiment, the location information corresponding to the second associated data in the hash table corresponding to the right table may include information of an offset position corresponding to the second associated data in the hash table and element position information corresponding to the offset position (i.e., the second associated data corresponds to which element in the offset position). The corresponding position in the data structure corresponding to the hash table may be determined according to the information of the offset position corresponding to the second associated data in the hash table and the element position information corresponding to the offset position. In this way, the usage state information is modified at the corresponding position, that is, the usage state information "unused" is modified to "used". In a case that the target join type is a Right Half Join, the usage state information may be atomically modified at the corresponding position according to the information of the offset position corresponding to the second associated data in the hash table and the element position information corresponding to the offset position. That is, it cares about only the first time to modify "unused" into "used" but does not care about whether the usage state information is used again in the subsequent process.

In addition, when the usage state information of a certain piece of data in the right table is queried, a corresponding position in the data structure corresponding to the hash table may be determined based on the information about the offset position of the data in the hash table and the element position information corresponding to the offset position, so as to obtain the usage state information at the corresponding position, i.e., the usage state information of the required data.

On the basis of the above-mentioned embodiment, when a predetermined data structure is used to identify location information corresponding to second associated data in the hash table corresponding to a right table, information of the offset position corresponding to the second associated data in the hash table and the element position information corresponding to the offset position may be identified, respectively. Specifically, the predetermined data structure may include a first sub-data structure and a second sub-data structure. Here, information about offset positions corresponding to respective pieces of the second associated data in the hash table is recorded by using the first sub-data structure, and element location information corresponding to respective pieces of the second associated data in corresponding offset positions is recorded by using the second sub-data structure.

Optionally, when performing an equivalent join, the first sub-data structure may be used to record information about offset positions corresponding to respective pieces of the first associated data in the hash table, and the second sub-data may be used to record information about offset positions corresponding to respective pieces of the first associated data in the hash table. During the non-equivalent filtering, an array (referred to as a fourth sub-data structure) is used in the predetermined data structure to record a determining result indicating whether the first associated data meets the predetermined non-equivalent filtering condition. In this way, the offset position information corresponding to the first associated data satisfying the predetermined non-equivalent filtering condition in the hash table and the element position information corresponding to the offset position (that is, the offset position information corresponding to the second associated data in the hash table and the element location information corresponding to the offset location) may be obtained by combining the two arrays.

On the basis of any one of the above-mentioned embodiments, in a case that the target join type is a full join, a Left Outer Join, a Left Anti Join, a Left Half Join, or the like, the predetermined data structure needs to be used to identify location information corresponding to the second associated data in the left table, for example, a row number and so on.

The second associated data is data that satisfies the predetermined non-equivalent filtering condition in the first associated data. Therefore, optionally, when an equivalent join is performed, location information corresponding to the first associated data in the left table may be recorded by using an array (referred to as a third sub-data structure) in the predetermined data structure. When the non-equivalent filtering is performed, another array (referred to as a fourth sub-data structure) is used in the predetermined data structure to record a determining result indicating whether the first associated data meets the predetermined non-equivalent filtering condition. In this way, the location information, corresponding to the first associated data in the left table satisfying the predetermined equivalent filtering condition (that is, the location information corresponding to the second associated data in the left table) may be obtained by combining the two arrays.

Alternatively, in the columnar storage engine, the two data tables are data tables in the columnar storage engine, a column of row position information can be added to the left table in the column storage engine before the equivalent join, and location information (for example, a row number) of each row of the left table is recorded. Furthermore, the equivalent join is performed on the left table and the right table that are added with a column of a row position information by using a Hash Join to acquire the first associated data, so that the first associated data also has a column of the row location information, which can be used for identifying location information corresponding to the first associated data in the left table. The column of the row location information of the first associated data may be used as the above-mentioned third sub-data structure.

On the basis of the above-mentioned embodiment, a specific example is used to describe the above-mentioned method for processing a data table.

Example One

In this example, the target join type is a full Join. Assuming that the key in the left table is ID, the data in the ID column is [1, 1, 2, 3], the keys (ID) and values in the right table are [(1, 10), (1, 20), (3, 10), (5, 10)], and the predetermined non-equivalent filtering condition is that the value is greater than 10. The method for processing a data table may be as follows.

1) Establishing a hash table for a right table, constructing a first sub-data structure and a second sub-data structure, constructing a data structure corresponding to the hash table, and setting an initialization of usage state information about each element in the data structure corresponding to the hash table to "false" to indicate "unused". The details are as follows.

The first sub-data structure is used to record information of offset position of respective pieces of second associated data in a hash table. The second sub-data structure is used to record element location information of respective pieces of second associated data in respective offset positions.

| Hash Table | | | First Sub-Data Structure | Second Sub-Data Structure | Data Structure of Hash Table |
|---|---|---|---|---|---|
| Hash | ID | value | | | |
| 0 | 1 | 10 | 101 | 0 | False |
| | 1 | 20 | 101 | 1 | False |
| 1 | 3 | 10 | 104 | 0 | False |
| 2 | 5 | 10 | 105 | 0 | False |

2) Adding a column of row position information to the left table to record each row of position information of the left table. The column of row position information is as shown below.

| ID | Column of Row Position Information |
|---|---|
| 1 | 0 |
| 1 | 1 |
| 2 | 2 |
| 3 | 3 |

3) Performing an equivalent join on the left table and the right table, and acquiring first associated data of an association between the left table and the right table. In the equivalent join process, a third sub-data structure may be used to identify location information corresponding to the first associated data in the left table, and the first sub-data structure and the second sub-data structure are used to record location information of the first associated data in the hash table corresponding to the right table. The specific corresponding relationship is shown in the following intermediate table.

| First Associated Data | | | Predetermined Data Structure | | |
|---|---|---|---|---|---|
| ID of Left Table | ID of Right Table | Value | Third Sub-Data Structure | First Sub-Data Structure | Second Sub-Data Structure |
| 1 | 1 | 10 | 0 | 101 | 0 |
| 1 | 1 | 20 | 0 | 101 | 1 |
| 1 | 1 | 10 | 1 | 101 | 0 |
| 1 | 1 | 20 | 1 | 101 | 1 |
| 3 | 3 | 10 | 3 | 104 | 0 |

In an equivalent join, the data with ID of 1 in row 0 in the left table may be associated with (1, 10), (1, 20) in the right table. The data with an ID of 1 in row 1 in the left table may be associated with (1, 10), (1, 20) in the right table, and the data with an ID of 3 in row 3 in the left table may be associated with the (3, 10) in right table.

4) Filtering the first associated data according to a predetermined non-equivalent filtering condition (e.g., value greater than 10), and determining second associated data satisfying the predetermined non-equivalent filtering condition in the first associated data. A fourth sub-data structure is used to record a determining result of whether the first associated data satisfies a predetermined non-equivalent filtering condition (where the number 0 represents not satisfied, and the number 1 represents satisfied). The specific mapping relationship is shown in the following intermediate table.

| First Associated Data | | | Predetermined Data Structure | | | |
|---|---|---|---|---|---|---|
| | | | Fourth Sub-Data Structure | Third Sub-Data Structure | First Sub-Data Structure | Second Sub-Data Structure |
| ID of Left Table | ID of Right Table | Value | | | | |
| 1 | 1 | 10 | 0 | 0 | 101 | 0 |
| 1 | 1 | 20 | 1 | 0 | 101 | 1 |
| 1 | 1 | 10 | 0 | 1 | 101 | 0 |
| 1 | 1 | 20 | 1 | 1 | 101 | 1 |
| 3 | 3 | 10 | 0 | 3 | 104 | 0 |

Among the first associated data, only the first associated data with ID of 1 in row 0 in the left table and (1, 20) in the right table, and a first associated data with ID of 1 in row 1 in the left table and (1, 20) in the right table satisfy the predetermined non-equivalent filtering condition (e.g., value is greater than 10), that is, the two pieces of first associated data are used as the second associated data. With reference to the third sub-data structure and the fourth sub-data structure (only when the determining result is 1), it may be determined that the location information corresponding to the second correlated data in the left table is the row 0 and the row 1. By combining the fourth sub-data structure, the first sub-data structure and the second sub-data structure, it may be determined that information of an offset position corresponding to the second associated data in the hash table and element location information corresponding to the offset position is marked as (101,1). Further based on the information of the offset position corresponding to the second associated data in the hash table and the element location information corresponding to the offset position, the usage state information of the element corresponding to the second associated data in the data structure corresponding to the hash table is modified. Modification from "False" to "True" indicates "used", which is shown as follows.

| Hash Table | | | First Sub-Data | Second Sub-Data | Data Structure of |
|---|---|---|---|---|---|
| Hash | ID | value | Structure | Structure | Hash Table |
| 0 | 1 | 10 | 101 | 0 | False |
| | 1 | 20 | 101 | 1 | True |
| 1 | 3 | 10 | 104 | 0 | False |
| 2 | 5 | 10 | 105 | 0 | False |

5) Determining data in the left table other than the second associated data as data that is to be supplemented in the left table according to the location information, in the predetermined data structure (including the third sub-data structure and the fourth sub-data structure), corresponding to the second associated data in the left table; determining data in the right table other than the second associated data according to the data structure corresponding to the hash table; determining data in the right table other than the second associated data as data that is to be supplemented in the right table; generating a target join table based on the second associated data, the data that is to be supplemented in the left table and the data that is to be supplemented in the right table. The missing data in the data that is to be supplemented is marked as "null", and the obtained target join table is as follows.

| | Targe Join Table | |
|---|---|---|
| ID of Left Table | ID of Right Table | value |
| 1 | 1 | 20 |
| 1 | 1 | 20 |
| 2 | null | null |
| 3 | null | null |
| null | 1 | 10 |
| null | 3 | 10 |
| null | 5 | 10 |

It should be noted that the left table may be divided into at least two data blocks in rows, for example, a predetermined number of rows of each data block is 4096, and for a columnar storage engine, each data block stores data in columns.

Further, at step 2), the position information of each row of the left table recorded in the column of row position information is the position information of each row in the data block in which each row is located. In subsequent steps, equivalent join and non-equivalent join filtering may be performed by using a data block as a granularity. After performing equivalent join and non-equivalent join filtering on each data block of the left table and the right table, a group of second associated data may be determined. Meanwhile, location information corresponding to the second associated data in the left table may also be determined from the predetermined data structure by performing a traversing operation. In addition, the data in the data block other than the second correlated data may be determined as the data that is to be supplemented in the left table. The group of second associated data and the data that is to be supplemented in the left table may be written into the target join table without waiting for all the data in the left table have been performed the equivalent join and the non-equivalent filtering.

However, the data that is to be supplemented in the right table needs to be written into the target join table after all the data blocks in the left table are performed the equivalent join and the non-equivalent filtering. In this way, it can be determined which data in the right table is not associated with the left table, and therefore, only a data structure corresponding to a finally obtained hash table after performing equivalent join and the non-equivalent filtering on all data blocks in the left table can reflect which data in the right table is not associated with the left table. Therefore, by traversing the data structure corresponding to the finally obtained hash table, it is determined that the data that is to be supplemented in the right table is written into the target join table.

Example Two

In this example, the target join type is a Left Outer Join, and it only needs to use a predetermined data structure to identify location information corresponding to the second associated data in the left table. Assuming that a key in the left table is ID, data in an ID column is [1, 1, 2, 3], the keys (ID) and values in the right table are [(1, 10), (1, 20), (3, 10), (5, 10)], and the predetermined non-equivalent filtering condition is that the value is greater than 10. The method for processing a data table may be as follows.

1) Establishing a hash table for the right table, which is specifically as follows.

| | Hash Table | |
|---|---|---|
| Hash | ID | value |
| 0 | 1 | 10 |
| | 1 | 20 |
| 1 | 3 | 10 |
| 2 | 5 | 10 |

2) Adding a column of row position information to the left table to record position information of the left table. The column of row position information is as shown below.

| ID | Column of Row Position Information |
|---|---|
| 1 | 0 |
| 1 | 1 |

-continued

| ID | Column of Row Position Information |
|---|---|
| 2 | 2 |
| 3 | 3 |

3) Performing an equivalent join on the left table and the right table, and acquiring first associated data of an association between the left table and the right table. In the equivalent join process, a third sub-data structure may be used to identify location information corresponding to the first associated data in the left table. The specific corresponding relationship is shown in the following intermediate table.

| First Associated Data | | | Predetermined Data Structure |
|---|---|---|---|
| ID of Left Table | ID of Right Table | Value | Third Sub-Data Structure |
| 1 | 1 | 10 | 0 |
| 1 | 1 | 20 | 0 |
| 1 | 1 | 10 | 1 |
| 1 | 1 | 20 | 1 |
| 3 | 3 | 10 | 3 |

In an equivalent join, the data with ID of 1 in row 0 in the left table may be associated with (1, 10), (1, 20) in the right table. The data with an ID of 1 in row 1 in the left table may be associated with (1, 10), (1, 20) in the right table, and the data with an ID of 3 in row 3 in the left table may be associated with (3, 10) in the right table.

4) Filtering the first associated data according to a predetermined non-equivalent filtering condition (e.g., value greater than 10), and determining second associated data satisfying the predetermined non-equivalent filtering condition in the first associated data. A fourth sub-data structure is used to record a determining result of whether the first associated data satisfies a predetermined non-equivalent filtering condition (where the number 0 indicates that the predetermined non-equivalent filtering condition is not satisfied, and the number 1 indicates that the predetermined non-equivalent filtering condition is satisfied). The specific mapping relationship is shown in the following intermediate table.

| First Associated Data | | | Predetermined Data Structure | |
|---|---|---|---|---|
| ID of Left Table | ID of Right Table | Value | Fourth Sub-Data Structure | Third Sub-Data Structure |
| 1 | 1 | 10 | 0 | 0 |
| 1 | 1 | 20 | 1 | 0 |
| 1 | 1 | 10 | 0 | 1 |
| 1 | 1 | 20 | 1 | 1 |
| 3 | 3 | 10 | 0 | 3 |

Among the first associated data, only a first associated data with ID of 1 in row 0 in the left table and (1, 20) in the right table, and a first associated data with ID of 1 in row 1 in the left table and (1, 20) in the right table satisfy the predetermined equivalent filtering condition (e.g., value is greater than 10), and thus is used as the second associated data.

5) Determining data in the left table other than the second associated data as data that is to be supplemented in the left table according to the location information, in the predetermined data structure (including the third sub-data structure and the fourth sub-data structure), corresponding to the second associated data in the left table; generating a target join table based on the second associated data, and the data that is to be supplemented in the left table. The missing data in the data that is to be supplemented is marked as "null", and the obtained target join table is as follows.

| Targe Join Table | | |
|---|---|---|
| ID of Left Table | ID of Right Table | value |
| 1 | 1 | 20 |
| 1 | 1 | 20 |
| 2 | null | null |
| 3 | null | null |

It should be noted that the left table may be divided into at least two data blocks in rows, for example, a predetermined number of rows of each data block is 4096, and for a column storage engine, each data block stores data in columns.

Further, at step 2), the position information of each row of the left table recorded in the column of row position information is the position information of each row in the data block in which each row is located. In subsequent steps, equivalent join and non-equivalent join filtering may be performed by using a data block as a granularity. After performing equivalent join and non-equivalent join filtering on each data block of the left table and the right table, a group of second associated data may be determined. Meanwhile, location information corresponding to the second associated data in the left table may also be determined from the predetermined data structure by performing a traversing operation. In addition, the data in the data block other than the second correlated data may be determined as the data that is to be supplemented in the left table. The group of second associated data and the data that is to be supplemented in the left table may be written into the target connection table, without waiting for all the data in the left table have been performed the equivalent join and the non-equivalent filtering.

Example Three

In this example, a target join type is a Left Anti Join, and it only needs to use a predetermined data structure to identify location information corresponding to second associated data in a left table. Assume that the key in the left table is ID, data in an ID column is [1, 1, 2, 3], and the key (ID) and values in the right table are [(1, 10), (1, 20), (3, 10), (5, 10)], and the predetermined non-equivalent filtering condition is that the value is greater than 10. The method for processing a data table may be as follows.

Steps 1) to 4) of example 3 are the same as steps 1) to 4) of example 2.

5) Determining data in the left table other than the second associated data according to the location information, in the predetermined data structure (including the third sub-data structure and the fourth sub-data structure), corresponding to the second associated data in the left table; generating a target join table (only including the data in the left table, no "null" needs to be added) based on data in the left table other than the second associated data. The obtained target connection table is as follows.

| Targe Join Table ID of Left Table |
|---|
| 2 |
| 3 |

It should be noted that the left table may be divided into at least two data blocks in rows, for example, a predetermined number of rows of each data block is 4096, and for a column storage engine, each data block stores data in columns.

Further, at step 2), the position information of each row of the left table recorded in the column of row position information is the position information of each row in the data block in which each is located. In subsequent steps, equivalent join and non-equivalent join filtering may be performed by using a data block as a granularity. After performing equivalent join and non-equivalent join filtering on each data block of the left table and the right table, a group of second associated data may be determined. Meanwhile, location information corresponding to the second associated data in the left table may also be determined from the predetermined data structure by performing a traversing process. In addition, data other than the second associated data in the data block can be determined, and the data other than the second associated data in the data block can be written into the target connection table without waiting for all the data in the left table have been performed the equivalent join and the non-equivalent filtering.

Example Four

In this example, the target join type is Left Semi Join, and it only needs to use a predetermined data structure to identify location information corresponding to the second associated data in the left table. Assuming that a key in the left table is ID, data in an ID column is [1, 1, 2, 3], the keys (ID) and values in the right table are [(1, 10), (1, 20), (3, 10), (5, 10)], and a predetermined non-equivalent filtering condition is that the value is greater than 10. The method for processing a data table may be as follows.

Steps 1) to 4) of example 4 are the same as steps 1) to 4) of example 2.

5) Acquiring, in the predetermined data structure (a third sub-data structure and a fourth sub-data structure), location information about each first occurrence from location information corresponding to second associated data in the left table, and generating the target join table (only including data in the left table, without supplementing corresponding data in the right table) according to the data corresponding to the location information about each first occurrence in the left table. The acquired target join table is as follows.

| Targe Join Table ID of Left Table |
|---|
| 1 |

Assuming that a certain row of data in the left table is equivalently associated with two or more rows of data in the right table, and the predetermined non-equivalent filtering condition is satisfied, location information corresponding to the two rows of data in the left table is provided in the predetermined data structure. At step 5), only one of the two location information that appears for the first time is obtained. The corresponding data in the left table is determined and written into the target join table.

It should be noted that the left table may be divided into at least two data blocks in rows, for example, a predetermined number of rows of each data block is 4096, and for a column storage engine, each data block stores data in columns.

Further, at step 2), the position information of each row of the left table recorded in the column of row position information is the position information of each row in the data block in which each row is located. In subsequent steps, equivalent join and non-equivalent join filtering may be performed by using a data block as a granularity. After performing equivalent join and non-equivalent join filtering on each data block of the left table and the right table, a group of second associated data may be determined. Meanwhile, the data corresponding to the location information about each first in the data block may also be determined from the predetermined data structure by performing a traversing operation. The data is written into the target connection table without waiting for all the data in the left table have been performed the equivalent join and the non-equivalent filtering.

Example Five

In this example, the target join type is a Right Outer Join, and it only needs to use a predetermined data structure needs to identify location information corresponding to second associated data in a hash table corresponding to a right table. Assuming that the key in a left table is ID, data in an ID column is [1, 1, 2, 3], the keys (ID) and values in the right table are [(1, 10), (1, 20), (3, 10), (5,10)], and a predetermined non-equivalent filtering condition is that the value is greater than 10. The method for processing a data table may be as follows.

1) Establishing a hash table for a right table, constructing a first sub-data structure and a second sub-data structure, constructing a data structure corresponding to the hash table, and setting an initialization of usage state information about each element in the data structure corresponding to the hash table to "false" to indicate "unused". The details are as follows.

The first sub-data structure is used to record information of offset position of respective pieces of second associated data in a hash table. The second sub-data structure is used to record element location information of respective pieces of second associated data in respective offset positions.

| Hash Table | | | First Sub-Data | Second Sub-Data | Data Structure of |
|---|---|---|---|---|---|
| Hash | ID | value | Structure | Structure | Hash Table |
| 0 | 1 | 10 | 101 | 0 | False |
| | 1 | 20 | 101 | 1 | False |
| 1 | 3 | 10 | 104 | 0 | False |
| 2 | 5 | 10 | 105 | 0 | False |

2) Performing an equivalent join on the left table and the right table, and acquiring first associated data of an association between the left table and the right table. In the equivalent join process, the first sub-data structure and the second sub-data structure are used to record location information of the first associated data in the hash table corresponding to the right table. The specific corresponding relationship is shown in the following intermediate table.

| First Associated Data | | | Predetermined Data Structure | |
| --- | --- | --- | --- | --- |
| ID of Left Table | ID of Right Table | Value | First Sub-Data Structure | Second Sub-Data Structure |
| 1 | 1 | 10 | 101 | 0 |
| 1 | 1 | 20 | 101 | 1 |
| 1 | 1 | 10 | 101 | 0 |
| 1 | 1 | 20 | 101 | 1 |
| 3 | 3 | 10 | 104 | 0 |

In an equivalent join, the data with ID of 1 in row 0 in the left table may be associated with (1, 10), (1, 20) in the right table. The data with an ID of 1 in row 1 in the left table may be associated with the (1, 10), (1, 20) in the right table, and the data with an ID of 3 in row 3 in the left table may be associated with (3, 10) in the right table.

3) Filtering the first associated data according to a predetermined non-equivalent filtering condition (e.g., value greater than 10), and determining second associated data satisfying the predetermined non-equivalent filtering condition in the first associated data. A fourth sub-data structure is used to record a determining result of whether the first associated data satisfies the predetermined non-equivalent filtering condition (wherein the number 0 represents not satisfied, the number 1 represents satisfied). The specific mapping relationship is shown in the following intermediate table.

| First Associated Data | | | Predetermined Data Structure | | |
| --- | --- | --- | --- | --- | --- |
| ID of Left Table | ID of Right Table | Value | Fourth Sub-Data Structure | First Sub-Data Structure | Second Sub-Data Structure |
| 1 | 1 | 10 | 0 | 101 | 0 |
| 1 | 1 | 20 | 1 | 101 | 1 |
| 1 | 1 | 10 | 0 | 101 | 0 |
| 1 | 1 | 20 | 1 | 101 | 1 |
| 3 | 3 | 10 | 0 | 104 | 0 |

Among the first associated data, only the first associated data with ID of 1 in row 0 in the left table and (1, 20) in the right table, and the first associated data with ID of 1 in row 1 in the left table and (1, 20) in the right table satisfy the predetermined non-equivalent filtering condition (e.g., value greater than 10), and are used as the second associated data.

By combining the fourth sub-data structure, the first sub-data structure and the second sub-data structure, information of an offset position corresponding to the second associated data in the hash table and element location information corresponding to the offset position can be marked as (101,1). Further based on the information of the offset position corresponding to the second associated data in the hash table and the element position information corresponding to the offset position, the usage state information of the element corresponding to the second associated data in the data structure corresponding to the hash table is modified. Modification from "False" to "True" indicates "used", which is shown as follows.

| | Hash Table | | First Sub-Data Structure | Second Sub-Data Structure | Data Structure of Hash Table |
| --- | --- | --- | --- | --- | --- |
| Hash | ID | value | | | |
| 0 | 10 | 10 | 101 | 0 | False |
| | 20 | 20 | 101 | 1 | True |
| 1 | 3 | 10 | 104 | 0 | False |
| 2 | 5 | 10 | 105 | 0 | False |

4) Determining data in the right table other than the second associated data as data that is to be supplemented in the right table according to the data structure of the hash table; generating a target join table based on the second associated data, and the data that is to be supplemented in the right table. The missing data in the data that is to be supplemented is marked as "null", and the obtained target join table is as follows.

| Targe Join Table | | |
| --- | --- | --- |
| ID of Left Table | ID of Right Table | value |
| 1 | 1 | 20 |
| null | 1 | 10 |
| null | 3 | 10 |
| null | 5 | 10 |

It should be noted that the left table may be divided into at least two data blocks in rows, for example, a predetermined number of rows of each data block is 4096, and for a columnar storage engine, each data block stores data in columns.

Further, the data that is to be supplemented in the right table needs to be written into the target join table after all the data blocks in the left table are performed the equivalent join and the non-equivalent filtering. In this way, it can be determined which data in the right table is not associated with the left table, and therefore, only a data structure corresponding to a finally obtained hash table after performing equivalent join and the non-equivalent filtering on all data blocks in the left table can reflect which data in the right table is not associated with the left table. Therefore, by traversing the data structure corresponding to the finally obtained hash table, it is determined that the data that is to be supplemented in the right table is written into the target connection table.

Example Six

In this example, the target join type is a Right Anti Join, and only a predetermined data structure needs to be used to identify location information corresponding to second associated data in a hash table corresponding to a right table. Assuming that a key in a left table is ID, data in an ID column is [1, 1, 2, 3], the keys (ID) and values in the right table are [(1,10), (1,20), (3,10), (5,10)], and the predetermined non-equivalent filtering condition is that the value is greater than 10. The method for processing a data table may be as follows.

Steps 1) to 3) of example 6 are the same as steps 1) to 3) of example 4.

4) Determining data in the right table other than the second associated data according to the data structure corresponding to the hash table; generating a target join table (only including the data in the right table, no "null" needs to be added) based on the data in the right table other than the second associated data. The obtained target join table is shown as follows.

| Targe Join Table | |
| --- | --- |
| ID of Right Table | value |
| 1 | 10 |
| 3 | 10 |
| 5 | 10 |

It should be noted that the left table may be divided into at least two data blocks in rows, for example, a predetermined number of rows of each data block is 4096, and for a columnar storage engine, each data block stores data in columns.

Further, after all the data blocks in the left table are performed the equivalent join and the non-equivalent filtering, it can be determined which data in the right table is not associated with the left table, and therefore, only a data structure corresponding to a finally obtained hash table after performing equivalent join and the non-equivalent filtering on all data blocks in the left table can reflect which data in the right table is not associated with the left table. Therefore, by traversing the data structure corresponding to the finally obtained hash table, it is determined that data other than the second associated data in the right table is written into the target join table.

Example Seven

In this example, the target join type is a Right Half Join, and only a predetermined data structure needs to be used to identify location information corresponding to second associated data in a hash table corresponding to a right table. Assumed that a key in the left table is ID, data in an ID column is [1, 1, 2, 3], a keys (ID) and values in the right table are [(1, 10), (1, 20), (3, 10), (5, 10)], and a predetermined non-equivalent filtering condition is that the value is greater than 10. The method for processing a data table may be as follows.

Steps 1) to 2) of example 7 are the same as steps 1) to 2) of example 2.

3) Filtering the first associated data according to a predetermined non-equivalent filtering condition (e.g., value greater than 10), and determining second associated data satisfying the predetermined non-equivalent filtering condition in the first associated data. A fourth sub-data structure is used to record a determining result of whether the first associated data satisfies the predetermined non-equivalent filtering condition (wherein the number 0 represents not satisfied, the number 1 represents satisfied). The specific mapping relationship is as shown in the following intermediate table.

| First Associated Data | | | Predetermined Data Structure | | |
| --- | --- | --- | --- | --- | --- |
| ID of Left Table | ID of Right Table | Value | Fourth Sub-Data Structure | First Sub-Data Structure | Second Sub-Data Structure |
| 1 | 1 | 10 | 0 | 101 | 0 |
| 1 | 1 | 20 | 1 | 101 | 1 |
| 1 | 1 | 10 | 0 | 101 | 0 |

-continued

| First Associated Data | | | Predetermined Data Structure | | |
| --- | --- | --- | --- | --- | --- |
| ID of Left Table | ID of Right Table | Value | Fourth Sub-Data Structure | First Sub-Data Structure | Second Sub-Data Structure |
| 1 | 1 | 20 | 1 | 101 | 1 |
| 3 | 3 | 10 | 0 | 104 | 0 |

Among the first associated data, only the first associated data with ID of 1 in row 0 in the left table and (1, 20) in the right table, and the first associated data with ID of 1 in row 1 in the left table and (1, 20) in the right table satisfy the predetermined non-equivalent filtering condition (e.g., value is greater than 10), and are used as the second associated data.

By combining the fourth sub-data structure, the first sub-data structure and the second sub-data structure, information of an offset position corresponding to the second associated data in the hash table and element location information corresponding to the offset position can be marked as (101,1). Further based on the information of the offset position corresponding to the second associated data in the hash table and the element position information corresponding to the offset position, the usage state information of the element corresponding to the second associated data in the data structure corresponding to the hash table is modified. Modification from "False" to "True" indicates "used", which is shown as follows.

| Hash Table | | | First Sub-Data Structure | Second Sub-Data Structure | Data Structure of Hash Table |
| --- | --- | --- | --- | --- | --- |
| Hash | ID | value | | | |
| 0 | 1 | 10 | 101 | 0 | False |
| | 1 | 20 | 101 | 1 | True |
| 1 | 3 | 10 | 104 | 0 | False |
| 2 | 5 | 10 | 105 | 0 | False |

However, in this example, only the element whose usage state information is modified for the first time in the data structure corresponding to the hash table is cared. For example, it is assumed that a certain row of data in the right table is equivalently associated with more than two rows of data in the left table and satisfies a predetermined non-equivalent filtering condition. If the row of data in the right table is associated with a row of data in the left table and a predetermined non-equivalent e filtering condition is satisfied for the first time, location information corresponding to the row of data in the hash table is determined, that is, information of an offset position corresponding to the row of data in the hash table and an element location information corresponding to the offset position are determined. The usage state information of the element in the data structure corresponding to the hash table is first modified from "False" to "True". However, the row of data in the right table is again associated with another row of data in the left table, and satisfies the predetermined non-equivalent filtering condition, the position information corresponding to the row of data in the hash table is determined. At this point, when the usage state information of the corresponding element in the data structure corresponding to the hash table is modified, if the usage state information is found to be "True", the usage state information does not need to be modified, and the second associated data is not reserved any more. Optionally, a corresponding element may also be deleted from the hash table to avoid subsequent repetitive join matching.

4) Determining an element whose usage state information being first modified in the data structure corresponding to the hash table, and generating the target join table (only including the data in the right table, the data in the left table does not need to be supplemented) according to the data corresponding to the element whose usage state information being first modified in the right table. The obtained target join table is as follows.

| Targe Join Table | |
|---|---|
| ID of Right Table | value |
| 1 | 20 |

It should be noted that the left table may be divided into at least two data blocks in rows, for example, a predetermined number of rows of each data block is 4096, and for a columnar storage engine, each data block stores data in columns.

Further, any data in the right table may be written into target join table as long as the data can be joined to any data in the left table. No attention needs to be paid to whether the subsequent data is still joined to other data in the left table, and therefore, after an equivalent join and the non-equivalent filtering may be performed on each data block in the left table and the right table. According to a data structure corresponding to the hash table at this time, an element whose usage state information is modified for the first time may be determined. In addition, the corresponding data in the right table is written into the target join table without waiting for all the data in the left table have been performed the equivalent join and the non-equivalent filtering.

In conclusion, in examples 1 to 7, different target join types have different requirements for a predetermined data structure and a data structure corresponding to a hash table, and are summarized as shown in the following table.

| Join Type | Fourth Sub-Data Structure | Third Sub-Data Structure | First Sub-Data Structure | Second Sub-Data Structure | Data Structure of Hash Table |
|---|---|---|---|---|---|
| Full Join | ✓ | ✓ | ✓ | ✓ | ✓ |
| Left Outer Join | ✓ | ✓ | | | |
| Right Outer Join | ✓ | | ✓ | ✓ | ✓ |
| Left Semi Join | ✓ | ✓ | | | |
| Right Semi Join | ✓ | | ✓ | ✓ | ✓ |
| Left Anti Join | ✓ | ✓ | | | |
| Right Anti Join | ✓ | | ✓ | ✓ | ✓ |

Corresponding to the method for processing the data table in the above embodiment, FIG. 3 is a block diagram of a structure of a device for processing the data table according to an embodiment of the present disclosure. For ease of description, only parts related to the embodiments of the present disclosure are shown. Referring to FIG. 3, the data table processing device 300 comprises: an equivalent join unit 301, a non-equivalent filtering unit 302, an identifying unit 303, and a generating unit 304.

The equivalent join unit 301 is configured to perform an equivalent join on a left table and a right table in two data tables that are to be joined by means of a Hash Join, and acquire first associated data of an association between the left table and the right table;

a non-equivalent filtering unit 302, configured to filter the first associated data according to a predetermined non-equivalent filtering condition, and determine second associated data satisfying the predetermined non-equivalent filtering condition in the first associated data;

an identifying unit 303, configured to identify, in a predetermined data structure according to a target join type of the two data tables, location information corresponding to the second associated data in the left table and/or location information corresponding to the second associated data in a hash table corresponding to the right table;

a generating unit 304, configured to process the left table and/or the right table according to the target join type of the two data tables and the predetermined data structure to generate a target join table.

In one or more embodiments of the present disclosure, the identifying unit 303 is further configured to:

construct a data structure corresponding to the hash table, the data structure being used for recording usage state information about respective elements comprised in respective offset positions of the hash table, wherein any offset position of the hash table comprises at least one element, and one of the at least elements corresponds to a row of data in the right table;

After identifying, in the predetermined data structure, the location information corresponding to the second associated data in the hash table corresponding to the right table, the identifying unit 303 is further configured to:

modify, according to the location information corresponding to the second associated data in the hash table, usage state information of an element corresponding to the second associated data in the data structure corresponding to the hash table.

In one or more embodiments of the present disclosure, when the generating unit 304 processes the left table and/or the right table according to the target join types of the two data tables and the predetermined data structure to generate a target join table, the generating unit 304 is configured to:

in response to determining that the target join type is a full join, determine data in the left table other than the second associated data as data that is to be supplemented in the left table according to the location information, in the predetermined data structure, corresponding to the second associated data in the left table;

determine data that is to be supplemented in the right table according to the data structure corresponding to the hash table; and generate a target join table based on the second associated data, the data that is to be supplemented in the left table and the data that is to be supplemented in the right table.

In one or more embodiments of the present disclosure, the left table comprises at least two data blocks; correspondingly, when the generating unit determines data in the left table other than the second associated data as data that is to be supplemented in the left table according to the location information, in the predetermined data structure, corresponding to the second associated data in the left table, the generating unit 304 is configured to:

for a predetermined data structure obtained after performing an equivalent join and filtering under a predetermined non-equivalent filtering condition on any data block of the left table, determine data in the data block other than the second associated data as the data that is to be supplemented in the left table according to the location information, in the predetermined data structure, corresponding to the second associated data in the left table;

when the generating unit 304 determines the data that is to be supplemented in the right table according to the data structure corresponding to the hash table, the generating unit 304 is configured to:

for data structures corresponding to the hash table obtained after performing an equivalent join and filtering under a predetermined non-equivalent filtering condition on all data blocks of the left table, determining the data that is to be supplemented in the right table according to the data structure corresponding to the hash table.

In one or more embodiments of the present disclosure, when the generating unit 304 processes the left table and/or the right table according to the target join type of the two data tables and the predetermined data structure to generate the target join table, the generating unit 304 is configured to:

in response to determining that the target join type is a Left Outer Join, determine data in the left table other than the second associated data as the data to be supplemented in the left table according to the location information, in the predetermined data structure, corresponding to the second associated data in the left table; generate the target join table based on the second associated data and the data to be supplemented in the left table; or in response to determining that the target join type is a Left Anti Join, determine data in the left table other than the second associated data according to the location information, in the predetermined data structure, corresponding to the second associated data in the left table, and generate the target join table according to the data in the left table other than the second associated data; or in response to determining that the target join type is a Left Half Join, acquire location information about each first occurrence from the location information, in the predetermined data structure, corresponding to the second associated data in the left table, and generate the target join table according to data corresponding to the location information about each first occurrence in the left table.

In one or more embodiments of the present disclosure, the left table comprises at least two data blocks; and correspondingly, in response to determining that the target join type is a Left Outer Join, a Left Anti Join or a Left Half Join, the predetermined data structure is a predetermined data structure obtained after performing an equivalent join and filtering under a predetermined non-equivalent filtering condition on any data block of the left table.

In one or more embodiments of the present disclosure, when the generating unit 304 processes the left table and/or the right table according to the target join type of the two data tables and the predetermined data structure to generate the target join table, the generating unit 304 is configured to:

in response to determining that the target join type is a Right Outer Join, determine the data to be supplemented in the right table according to the data structure corresponding to the hash table;

generate the target join table based on the second associated data and the data to be supplemented in the right table; or in response to determining that the target join type is a Right Anti Join, determine data in the right table other than the second associated data according to the data structure corresponding to the hash table, and generate the target join table according to the data in the right table other than the second associated data; or in response to determining that the target join type is a Right Half Join, determine an element whose usage state information being first modified in the data structure corresponding to the hash table, and generate the target join table according to the data corresponding to the element whose usage state information being first modified in the right table.

In one or more embodiments of the present disclosure, the left table comprises at least two data blocks; correspondingly, in response to determining that the target join type is a Right Outer Join, determining the data to be supplemented in a right table according to the data structure corresponding to the hash table, the generating unit 304 is configured to:

for the data structure corresponding to the hash table obtained after performing an equivalent join and filtering under a predetermined non-equivalent filtering condition on all data blocks of the left table, determine the data to be supplemented in the right table according to the data structure corresponding to the hash table; or in response to determining that the target join type is a Right Anti Join, determine the data in the right table other than the second associated data according to the data structure corresponding to the hash table, the generating unit 304 is configured to:

for the data structure corresponding to the hash table obtained after performing an equivalent join and filtering under a predetermined non-equivalent filtering condition on all the data blocks of the left table, determining the data in the right table other than the second associated data according to the data structure corresponding to the hash table; or in response to determining that the target join type is the Right Half Join, when the generating unit 304 determines the element whose usage state information being first modified in the data structure corresponding to the hash table, the generating unit 304 is configured to:

for the data structure corresponding to the hash table obtained after performing an equivalent join and filtering under a predetermined non-equivalent filtering condition on any data block in the left table, determine the element whose usage state information of the element being first modified in the data structure corresponding to the hash table.

In one or more embodiments of the present disclosure, the predetermined data structure comprises a first sub-data structure and a second sub-data structure; correspondingly, in response to identifying in the predetermined data structure the location information corresponding to the second associated data in the hash table corresponding to the right table, the identifying unit 303 is configured to:

record information about offset positions corresponding to respective pieces of the second associated data in the hash table by using the first sub-data structure;

record element location information corresponding to respective pieces of the second associated data in corresponding offset positions by using the second sub-data structure.

In one or more embodiments of the present disclosure, the predetermined data structure comprises a third sub-data structure and a fourth sub-data structure; correspondingly, when the identifying unit 303 identifies in the predetermined data structure the location information corresponding to the second associated data in the left table, the identifying unit 303 is configured to:

record location information of respective pieces of first associated data in the left table by using the third sub-data structure;

record determination results indicating whether respective pieces of the first associated data satisfy the predetermined non-equivalent filtering condition by using the fourth sub-data structure; and obtain location information of the second associated data in the left table by combining the third sub-data structure and the fourth sub-data structure.

In one or more embodiments of the present disclosure, the two data tables are data tables in a columnar storage engine; correspondingly, before performing the equivalent join on the left table and the right table in the two data tables that are to be joined by means of a Hash Join, the generating unit 304 is further configured to:

add a row location information column in the columnar storage engine to the left table for recording location information of each row of the left table;

when the equivalent join is performed on the left table and the right table in the two data tables that are to be joined by means of the Hash Join, and acquiring the first associated data of the association between the left table and the right table, the equivalent join unit 301 is configured to:

perform an equivalent join on the left table and the right table after the row location information column is added by means of the Hash Join, so as to acquire the first associated data.

In one or more embodiments of the present disclosure, location information corresponding to any data in the left table is location information of the data in the data block where the data is located; the equivalent join unit 301 is configured to:

perform an equivalent join for each data block of the left table and the right table by mean of a Hash Join.

The device for processing a data table provided in this embodiment may be used to execute the technical solutions of the foregoing method embodiments, and implementation principles and technical effects of the device are similar, and are not repeatedly described herein in this embodiment.

Figure 4:
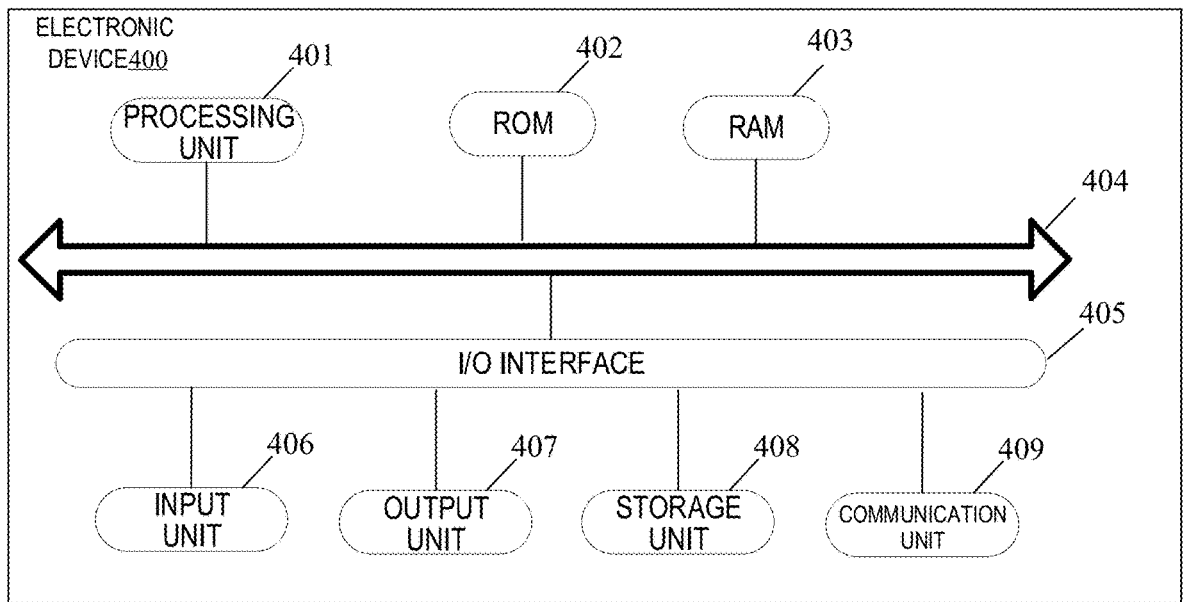
FIG. 4 shows a schematic diagram of a hardware of an electronic device according to an embodiment of the present disclosure.

Referring to FIG. 4, FIG. 4 shows a schematic diagram of an electronic device 400 suitable for implementing an embodiment of the present disclosure. The electronic device 400 may be a terminal device or a server. The terminal device may include, but is not limited to, a mobile terminal such as a mobile phone, a laptop computer, a digital broadcast receiver, a personal digital assistant (Personal Digital Assistant, PDA for short), a tablet computer (Portable Android Device, PAD for short), a portable multimedia player (Portable Media Player, PMP for short), a vehicle-mounted terminal (for example, a vehicle-mounted navigation terminal), and the like, and a fixed terminal such as a digital TV, a desktop computer, and the like. The electronic device shown in FIG. 4 is merely an example and should not bring any limitation to the functions and scope of use of embodiments of the present disclosure.

As shown in FIG. 4, the electronic device 400 may include a processing unit (e.g., a central processing unit, a graphics processor, etc.) 401 that may perform various suitable actions and processes in accordance with a program stored in a read only memory (ROM) 402 or a program loaded into a random access memory (RAM) 403 from a storage unit 408. In the RAM 403, various programs and data necessary for the operation of the electronic device 400 are also stored. The processing unit 401, the ROM 402, and the RAM 403 are connected to each other via the bus 404. An input/output (I/O) interface 405 is also connected to the bus 404.

In general, the following devices may be connected to the I/O interface 405: input units 406 including, for example, touch screens, touch pads, keyboards, mice, cameras, microphones, accelerometers, gyroscopes, etc.; an output unit 407 including, for example, a liquid crystal display (LCD), a speaker, a vibrator, or the like; a storage unit 408 including, for example, a magnetic tape, a hard disk, or the like; and a communication unit 409. Communication unit 409 can allow electronic device 400 to wirelessly or wired communicate with other devices to exchange data. While FIG. 4 illustrates an electronic device 400 with a variety of means, it is to be understood that not all of the illustrated means are required to be implemented or provided. More or fewer devices may alternatively be implemented or provided.

In particular, the processes described above with reference to the flowcharts can be implemented as computer software programs in accordance with embodiments of the present disclosure. For example, embodiments of the present disclosure include a computer program product comprising a computer program carried on a computer readable medium. The computer program comprises a program code for executing the method as shown in the flowchart. In such an embodiment, the computer program may be downloaded and installed from the network through communication unit 409, or installed from storage unit 408, or installed from ROM 402. When the computer program is executed by the processing unit 401, the described functions defined in the method according to the embodiment of the present disclosure are executed.

It should be noted that the computer readable medium in the present disclosure may be a computer readable signal medium or a computer readable storage medium, or any combination thereof. A computer-readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that can contain or store a program for use by or in connection with an instruction execution system, apparatus, or device. While in the present disclosure, a computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may also be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including, but not limited to, wireline, optical fiber cable, RF (radio frequency), etc., or any suitable combination of the foregoing.

The computer readable medium may be included in the electronic device, or may exist separately and not be installed in the electronic device.

The computer readable medium bears one or more programs, and when the one or more programs are executed by the electronic device, the electronic device is enabled to execute the method shown in the foregoing embodiments.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments of the present disclosure may be implemented through software or hardware. The name of a unit does not constitute a limitation to the unit itself in some cases, for example, the first acquisition unit may also be described as "unit to acquire at least two internet protocol addresses".

The functions described herein above may be performed, at least in part, by one or more hardware logic components. For example, without limitation, exemplary types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In the context of this disclosure, a machine-readable medium may be tangible media that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

According to a first aspect, according to one or more embodiments of the present disclosure, a method for processing a data table is provided, including:

performing an equivalent join on a left table and a right table in two data tables that are to be joined by means of a Hash Join, and acquiring first associated data of an association between the left table and the right table;

filtering the first associated data according to a predetermined non-equivalent filtering condition, and determining second associated data satisfying the predetermined non-equivalent filtering condition in the first associated data;

identifying, in a predetermined data structure according to a target join type of the two data tables, location information corresponding to the second associated data in the left table and/or location information corresponding to the second associated data in a hash table corresponding to the right table; and processing the left table and/or the right table according to the target join type of the two data tables and the predetermined data structure to generate a target join table.

According to one or more embodiments of the present disclosure, the method further comprises:

constructing a data structure corresponding to the hash table, the data structure being used for recording usage state information about respective elements comprised in respective offset positions of the hash table, wherein any offset position of the hash table comprises at least one element, and one of the at least elements corresponds to a row of data in the right table;

the method further comprises: after identifying, in the predetermined data structure, the location information corresponding to the second associated data in the hash table corresponding to the right table:

modifying, according to the location information corresponding to the second associated data in the hash table, usage state information of an element corresponding to the second associated data in the data structure corresponding to the hash table.

According to one or more embodiments of the present disclosure, processing the left table and/or the right table according to the target join type of the two data tables and the predetermined data structure to generate the target join table comprises:

in response to determining that the target join type is a full join, determining data in the left table other than the second associated data as data that is to be supplemented in the left table according to the location information, in the predetermined data structure, corresponding to the second associated data in the left table;

determining data that is to be supplemented in the right table according to the data structure corresponding to the hash table;

and generating a target join table based on the second associated data, the data that is to be supplemented in the left table and the data that is to be supplemented in the right table.

According to one or more embodiments of the present disclosure, the left table comprises at least two data blocks; correspondingly, determining data in the left table other than the second associated data as data that is to be supplemented in the left table according to the location information, in the predetermined data structure, corresponding to the second associated data in the left table comprises:

for a predetermined data structure obtained after performing an equivalent join and filtering under a predetermined non-equivalent filtering condition on any data block of the left table, determining data in the data block other than the second associated data as the data that is to be supplemented in the left table according to the location information, in the predetermined data structure, corresponding to the second associated data in the left table;

determining the data that is to be supplemented in the right table according to the data structure corresponding to the hash table comprises:

and for data structures corresponding to the hash table obtained after performing an equivalent join and filtering under a predetermined non-equivalent filtering condition on all data blocks of the left table, determining the data that is to be supplemented in the right table according to the data structure corresponding to the hash table.

processing the left table and/or the right table according to the target join type of the two data tables and the predetermined data structure to generate the target join table comprises:

in response to determining that the target join type is a Left Outer Join, determining data in the left table other than the second associated data as the data to be supplemented in the left table according to the location information, in the predetermined data structure, corresponding to the second associated data in the left table; generating the target join table based on the second associated data and the data to be supplemented in the left table; or in response to determining that the target join type is a Left Anti Join, determining data in the left table other than the second associated data according to the location information, in the predetermined data structure, corresponding to the second associated data in the left table, and generating the target join table according to the data in the left table other than the second associated data; or in response to determining that the target join type is a Left Half Join, acquiring location information about each first occurrence from the location information, in the predetermined data structure, corresponding to the second associated data in the left table, and generating the target join table according to data corresponding to the location information about each first occurrence in the left table.

According to one or more embodiments of the present disclosure, the left table comprises at least two data blocks; correspondingly, in response to determining that the target join type is a Left Outer Join, a Left Anti Join or a Left Half Join, the predetermined data structure is a predetermined data structure obtained after performing an equivalent join and filtering under a predetermined non-equivalent filtering condition on any data block of the left table.

According to one or more embodiments of the present disclosure, processing the left table and/or the right table according to the target join type of the two data tables and the predetermined data structure to generate the target join table comprises:

in response to determining that the target join type is a Right Outer Join, determining the data to be supplemented in the right table according to the data structure corresponding to the hash table; generating the target join table based on the second associated data and the data to be supplemented in the right table; or in response to determining that the target join type is a Right Anti Join, determining data in the right table other than the second associated data according to the data structure corresponding to the hash table, and generating the target join table according to the data in the right table other than the second associated data; or in response to determining that the target join type is a Right Half Join, determining an element whose usage state information being first modified in the data structure corresponding to the hash table, and generating the target join table according to the data corresponding to the element whose usage state information being first modified in the right table.

According to one or more embodiments of the present disclosure, the left table comprises at least two data blocks; correspondingly, in response to determining that the target join type is a Right Outer Join, determining the data to be supplemented in a right table according to the data structure corresponding to the hash table comprises:

for the data structure corresponding to the hash table obtained after performing an equivalent join and filtering under a predetermined non-equivalent filtering condition on all data blocks of the left table, determining the data to be supplemented in the right table according to the data structure corresponding to the hash table; or in response to determining that the target join type is a Right Anti Join, determining the data in the right table other than the second associated data according to the data structure corresponding to the hash table comprises:

for the data structure corresponding to the hash table obtained after performing an equivalent join and filtering under a predetermined non-equivalent filtering condition on all the data blocks of the left table, determining the data in the right table other than the second associated data according to the data structure corresponding to the hash table; or in response to determining that the target join type is the Right Half Join, determining the element whose usage state information being first modified in the data structure corresponding to the hash table comprising:

for the data structure corresponding to the hash table obtained after performing an equivalent join and filtering under a predetermined non-equivalent filtering condition on any data block in the left table, determining the element whose usage state information of the element being first modified in the data structure corresponding to the hash table.

According to one or more embodiments of the present disclosure, the predetermined data structure comprises a first sub-data structure and a second sub-data structure; correspondingly, identifying in the predetermined data structure the location information corresponding to the second associated data in the hash table corresponding to the right table comprises:

recording information about offset positions corresponding to respective pieces of the second associated data in the hash table by using the first sub-data structure;

recording element location information corresponding to respective pieces of the second associated data in corresponding offset positions by using the second sub-data structure.

According to one or more embodiments of the present disclosure, the predetermined data structure comprises a third sub-data structure and a fourth sub-data structure; correspondingly, the identifying in the predetermined data structure the location information corresponding to the second associated data in the left table comprises:

recording location information of respective pieces of first associated data in the left table by using the third sub-data structure;

recording determination results indicating whether respective pieces of the first associated data satisfy the predetermined non-equivalent filtering condition by using the fourth sub-data structure;

and obtaining location information of the second associated data in the left table by combining the third sub-data structure and the fourth sub-data structure.

According to one or more embodiments of the present disclosure, the two data tables are data tables in a columnar storage engine; correspondingly, the method further comprises:

before performing the equivalent join on the left table and the right table in the two data tables that are to be joined by means of a Hash Join, adding a row location information column in the columnar storage engine to the left table for recording location information of each row of the left table;

performing the equivalent join on the left table and the right table in the two data tables that are to be joined by means of the Hash Join, and acquiring the first associated data of the association between the left table and the right table comprises:

performing an equivalent join on the left table and the right table after the row location information column is added by means of the Hash Join, so as to acquire the first associated data.

According to one or more embodiments of the present disclosure, location information corresponding to any data in the left table is location information of the data in the data block where the data is located;

performing the equivalent join on the left table and the right table in the two data tables that are to be joined by means of the Hash Join comprises:

performing an equivalent join for each data block of the left table and the right table by mean of a Hash Join.

According to a second aspect, according to one or more embodiments of the present disclosure, a device for processing a data table is provided, the device comprises:

an equivalent join unit, configured to perform an equivalent join on a left table and a right table in two data tables that are to be joined by means of a Hash Join, and acquire first associated data of an association between the left table and the right table;

a non-equivalent filtering unit, configured to filter the first associated data according to a predetermined non-equivalent filtering condition, and determine second associated data satisfying the predetermined non-equivalent filtering condition in the first associated data;

an identifying unit, configured to identify, in a predetermined data structure according to a target join type of the two data tables, location information corresponding to the second associated data in the left table and/or location information corresponding to the second associated data in a hash table corresponding to the right table;

a generating unit, configured to process the left table and/or the right table according to the target join type of the two data tables and the predetermined data structure to generate a target join table.

According to one or more embodiments of the present disclosure, the identifying unit is further configured to:

construct a data structure corresponding to the hash table, the data structure being used for recording usage state information about respective elements comprised in respective offset positions of the hash table, wherein any offset position of the hash table comprises at least one element, and one of the at least elements corresponds to a row of data in the right table;

after identifying, in the predetermined data structure, the location information corresponding to the second associated data in the hash table corresponding to the right table, the identifying unit is configured to:

modify, according to the location information corresponding to the second associated data in the hash table, usage state information of an element corresponding to the second associated data in the data structure corresponding to the hash table.

According to one or more embodiments of the present disclosure, when the generating unit processes the left table and/or the right table according to the target join type of the two data tables and the predetermined data structure to generate the target join table, the generating unit is configured to:

in response to determining that the target join type is a full join, determine data in the left table other than the second associated data as data that is to be supplemented in the left table according to the location information, in the predetermined data structure, corresponding to the second associated data in the left table;

determine data that is to be supplemented in the right table according to the data structure corresponding to the hash table;

and generate a target join table based on the second associated data, the data that is to be supplemented in the left table and the data that is to be supplemented in the right table.

According to one or more embodiments of the present disclosure, the left table comprises at least two data blocks; correspondingly, when the generating unit determines data in the left table other than the second associated data as data that is to be supplemented in the left table according to the location information, in the predetermined data structure, corresponding to the second associated data in the left table, the generating unit is configured to:

for a predetermined data structure obtained after performing an equivalent join and filtering under a predetermined non-equivalent filtering condition on any data block of the left table, determining data in the data block other than the second associated data as the data that is to be supplemented in the left table according to the location information, in the predetermined data structure, corresponding to the second associated data in the left table;

When the generating unit determines the data that is to be supplemented in the right table according to the data structure corresponding to the hash table, the generating unit is configured to:

for data structures corresponding to the hash table obtained after performing an equivalent join and filtering under a predetermined non-equivalent filtering condition on all data blocks of the left table, determining the data that is to be supplemented in the right table according to the data structure corresponding to the hash table.

According to one or more embodiments of the present disclosure, when the generating unit processes the left table and/or the right table according to the target join type of the two data tables and the predetermined data structure to generate the target join table, the generating unit is configured to:

in response to determining that the target join type is a Left Outer Join, determining data in the left table other than the second associated data as the data to be supplemented in the left table according to the location information, in the predetermined data structure, corresponding to the second associated data in the left table; generating the target join table based on the second associated data and the data to be supplemented in the left table; or in response to determining that the target join type is a Left Anti Join, determining data in the left table other than the second associated data according to the location information, in the predetermined data structure, corresponding to the second associated data in the left table, and generating the target join table according to the data in the left table other than the second associated data; or in response to determining that the target join type is a Left Half Join, acquiring location information about each first occurrence from the location information, in the predetermined data structure, corresponding to the second associated data in the left table, and generating the target join table according to data corresponding to the location information about each first occurrence in the left table.

According to one or more embodiments of the present disclosure, the left table comprises at least two data blocks; and correspondingly, in response to determining that the target join type is a Left Outer Join, a Left Anti Join or a Left Half Join, the predetermined data structure is a predetermined data structure obtained after performing an equivalent join and filtering under a predetermined non-equivalent filtering condition on any data block of the left table.

According to one or more embodiments of the present disclosure, when the generating unit processes the left table and/or the right table according to the target join type of the two data tables and the predetermined data structure to generate the target join table, the generating unit is configured to:

in response to determining that the target join type is a Right Outer Join, determine the data to be supplemented in the right table according to the data structure corresponding to the hash table;

generate the target join table based on the second associated data and the data to be supplemented in the right table; or in response to determining that the target join type is a Right Anti Join, determine data in the right table other than the second associated data according to the data structure corresponding to the hash table, and generate the target join table according to the data in the right table other than the second associated data; or in response to determining that the target join type is a Right Half Join, determine an element whose usage state information being first modified in the data structure corresponding to the hash table, and generate the target join table according to the data corresponding to the element whose usage state information being first modified in the right table.

According to one or more embodiments of the present disclosure, the left table comprises at least two data blocks; correspondingly, in response to determining that the target join type is a Right Outer Join, determining the data to be supplemented in a right table according to the data structure corresponding to the hash table, the generating unit is configured to:

for the data structure corresponding to the hash table obtained after performing an equivalent join and filtering under a predetermined non-equivalent filtering condition on all data blocks of the left table, determine the data to be supplemented in the right table according to the data structure corresponding to the hash table; or in response to determining that the target join type is a Right Anti Join, determining the data in the right table other than the second associated data according to the data structure corresponding to the hash table, the generating unit is configured to:

for the data structure corresponding to the hash table obtained after performing an equivalent join and filtering under a predetermined non-equivalent filtering condition on all the data blocks of the left table, determining the data in the right table other than the second associated data according to the data structure corresponding to the hash table; or in response to determining that the target join type is the Right Half Join, determining the element whose usage state information being first modified in the data structure corresponding to the hash table, the generating unit is configured to:

for the data structure corresponding to the hash table obtained after performing an equivalent join and filtering under a predetermined non-equivalent filtering condition on any data block in the left table, determine the element whose usage state information of the element being first modified in the data structure corresponding to the hash table.

According to one or more embodiments of the present disclosure, the predetermined data structure comprises a first sub-data structure and a second sub-data structure; correspondingly, when the identifying unit identifies in the predetermined data structure the location information corresponding to the second associated data in the hash table corresponding to the right table, the identifying unit is configured to:

recording information about offset positions corresponding to respective pieces of the second associated data in the hash table by using the first sub-data structure;

recording element location information corresponding to respective pieces of the second associated data in corresponding offset positions by using the second sub-data structure.

According to one or more embodiments of the present disclosure, the predetermined data structure comprises a third sub-data structure and a fourth sub-data structure; correspondingly, when the identifying unit identifies in the predetermined data structure the location information corresponding to the second associated data in the left table, the identifying unit is configured to:

record location information of respective pieces of first associated data in the left table by using the third sub-data structure;

record determination results indicating whether respective pieces of the first associated data satisfy the predetermined non-equivalent filtering condition by using the fourth sub-data structure; and obtain location information of the second associated data in the left table by combining the third sub-data structure and the fourth sub-data structure.

According to one or more embodiments of the present disclosure, the two data tables are data tables in a columnar storage engine; correspondingly, before performing the equivalent join on the left table and the right table in the two data tables that are to be joined by means of a Hash Join, the generating unit is further configured to:

add a row location information column in the columnar storage engine to the left table for recording location information of each row of the left table;

when performing the equivalent join on the left table and the right table in the two data tables that are to be joined by means of the Hash Join, and acquiring the first associated data of the association between the left table and the right table, the equivalent join unit is configured to:

perform an equivalent join on the left table and the right table after the row location information column is added by means of the Hash Join, so as to acquire the first associated data.

According to one or more embodiments of the present disclosure, location information corresponding to any data in the left table is location information of the data in the data block where the data is located;

when performing the equivalent join on the left table and the right table in the two data tables that are to be joined by means of the Hash Join, the equal value connecting unit is configured to:

perform an equivalent join for each data block of the left table and the right table by mean of a Hash Join.

According to a third aspect, according to one or more embodiments of the present disclosure, there is provided an electronic device, comprising: at least one processing unit;

at least one memory coupled to the at least one processing unit and storing instructions to be executed by the at least one processing unit;

the instructions, when executed by the at least one processing unit, causing the electronic device to perform the method for processing a data table according to the first aspect and various possible designs of the first aspect.

According to a fourth aspect, according to one or more embodiments of the present disclosure, a computer readable storage medium is provided, where the computer readable storage medium stores a computer execution instruction, and when the processor executes the computer execution instruction, the method for processing a data table according to the first aspect and various possible designs of the first aspect is implemented.

According to a fifth aspect, a computer program product is provided according to one or more embodiments of the present disclosure. The computer program product comprises a computer execution instruction. When a processor executes the computer execution instruction, the processing method for a data table according to the first aspect and various possible designs of the first aspect is implemented.

The foregoing description is merely illustrative of the preferred embodiments of the present disclosure and of the technical principles applied thereto, as will be appreciated by those skilled in the art. The disclosure of the present disclosure is not limited to the technical solution formed by the specific combination of the described technical features. At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented in multiple embodiments separately or in any suitable sub combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

We claim:

1. A method for processing a data table at an electronic device, comprising:

performing, by the electronic device, based on a hash table corresponding to a right table of two data tables stored in a columnar storage engine, an equivalent join on a left table of the two data tables and the right table by means of a hash join, and acquiring first associated data of an association between the left table and the right table;

filtering the first associated data according to a predetermined non-equivalent filtering condition, and determining second associated data satisfying the predetermined non-equivalent filtering condition in the first associated data;

identifying, according to a target join type of the two data tables, location information of the second associated data in the left table and/or location information of the second associated data in the hash table corresponding to the right table in a predetermined data structure stored in the columnar storage engine, wherein identifying location information of the second associated data in the hash table corresponding to the right table comprises: identifying information of an offset position corresponding to the second associated data in the hash table and the element position information corresponding to the offset position respectively, and/or wherein identifying location information of the second associated data in the left table comprises: recording location information of the first associated data in the left table when an equivalent join is performed and recording a determining result indicating whether the first associated data meets the predetermined non-equivalent filtering condition when non-equivalent filtering is performed; and generating a target joined table by processing the left table and/or the right table according to the target join type of the two data tables and the predetermined data structure.

2. The method of claim 1, further comprising:

constructing a data structure corresponding to the hash table, the data structure being used for recording usage state information about respective elements comprised in respective offset positions of the hash table, wherein any offset position of the hash table comprises at least one element, and one of the at least elements corresponds to a row of data in the right table;

the method further comprises: after the identifying, in the predetermined data structure, the location information of the second associated data in the hash table corresponding to the right table, modifying, according to the location information of the second associated data in the hash table, usage state information of an element of the second associated data in the data structure corresponding to the hash table.

3. The method of claim 2, wherein generating the target joined table by processing the left table and/or the right table according to the target join type of the two data tables and the predetermined data structure comprises:

in response to determining that the target join type is a full join, determining data in the left table other than the second associated data as the data that is to be supplemented in the left table according to the location information, in the predetermined data structure, of the second associated data in the left table;

determining the data that is to be supplemented in the right table according to the data structure corresponding to the hash table; and generating a target joined table based on the second associated data, the data that is to be supplemented in the left table and the data that is to be supplemented in the right table.

4. The method of claim 3, wherein the left table comprises at least two data blocks; correspondingly, determining data in the left table other than the second associated data as the data that is to be supplemented in the left table according to the location information, in the predetermined data structure, of the second associated data in the left table comprises:

for a predetermined data structure obtained after performing an equivalent join and filtering under a predetermined non-equivalent filtering condition on any data block of the left table, determining data in the data block other than the second associated data as the data that is to be supplemented in the left table according to the location information, in the predetermined data structure, of the second associated data in the left table;

determining the data that is to be supplemented in the right table according to the data structure corresponding to the hash table comprises:

for data structures corresponding to the hash table obtained after performing an equivalent join and filtering under a predetermined non-equivalent filtering condition on all data blocks of the left table, determining the data that is to be supplemented in the right table according to the data structure corresponding to the hash table.

5. The method of claim 4, wherein location information of any data in the left table is location information of the data in the data block where the data is located;

performing the equivalent join on the left table and the right table in the two data tables by means of the hash join comprises:

performing an equivalent join for each data block of the left table and the right table by mean of a hash join.

6. The method of claim 2, wherein generating the target joined table by processing the left table and/or the right table according to the target join type of the two data tables and the predetermined data structure comprises:

in response to determining that the target join type is a right outer join, determining the data to be supplemented in the right table according to the data structure corresponding to the hash table; generating the target joined table based on the second associated data and the data to be supplemented in the right table; or in response to determining that the target join type is a right anti join, determining data in the right table other than the second associated data according to the data structure corresponding to the hash table, and generating the target joined table according to the data in the right table other than the second associated data; or in response to determining that the target join type is a right half join, determining an element whose usage state information being first modified in the data structure corresponding to the hash table, and generating the target joined table according to the data corresponding to the element whose usage state information being first modified in the right table.

7. The method of claim 6, wherein the left table comprises at least two data blocks; correspondingly, in response to determining that the target join type is a right outer join, determining the data to be supplemented in a right table according to the data structure corresponding to the hash table comprises:

for the data structure corresponding to the hash table obtained after performing an equivalent join and filtering under a predetermined non-equivalent filtering condition on all data blocks of the left table, determining the data to be supplemented in the right table according to the data structure corresponding to the hash table; or in response to determining that the target join type is a right anti join, determining the data in the right table other than the second associated data according to the data structure corresponding to the hash table comprises:

for the data structure corresponding to the hash table obtained after performing an equivalent join and filtering under a predetermined non-equivalent filtering condition on all the data blocks of the left table, determining the data in the right table other than the second associated data according to the data structure corresponding to the hash table; or in response to determining that the target join type is the right half join, determining the element whose usage state information being first modified in the data structure corresponding to the hash table comprising:

for the data structure corresponding to the hash table obtained after performing an equivalent join and filtering under a predetermined non-equivalent filtering condition on any data block in the left table, determining the element whose usage state information of the element being first modified in the data structure corresponding to the hash table.

8. The method of claim 1, wherein generating the target joined table by processing the left table and/or the right table according to the target join type of the two data tables and the predetermined data structure comprises:

in response to determining that the target join type is a left outer join, determining data in the left table other than the second associated data as the data to be supplemented in the left table according to the location information, in the predetermined data structure, of the second associated data in the left table; generating the target joined table based on the second associated data and the data to be supplemented in the left table; or in response to determining that the target join type is a left anti join, determining data in the left table other than the second associated data according to the location information, in the predetermined data structure, of the second associated data in the left table, and generating the target joined table according to the data in the left table other than the second associated data; or in response to determining that the target join type is a left half join, acquiring location information about each first occurrence from the location information, in the predetermined data structure, of the second associated data in the left table, and generating the target joined table according to data corresponding to the location information about each first occurrence in the left table.

9. The method of claim 8, wherein the left table comprises at least two data blocks; correspondingly, in response to determining that the target join type is a left outer join, a left anti join or a left half join, the predetermined data structure is a predetermined data structure obtained after performing an equivalent join and filtering under a predetermined non-equivalent filtering condition on any data block of the left table.

10. The method of claim 1, wherein the predetermined data structure comprises a third sub-data structure and a fourth sub-data structure; correspondingly, the identifying the location information of the second associated data in the left table in the predetermined data structure comprises:

recording location information of respective pieces of first associated data in the left table by using the third sub-data structure;

recording determination results indicating whether respective pieces of the first associated data satisfy the predetermined non-equivalent filtering condition by using the fourth sub-data structure; and obtaining location information of the second associated data in the left table by combining the third sub-data structure and the fourth sub-data structure.

11. The method of claim 10, wherein the two data tables are data tables in a columnar storage engine; correspondingly, the method further comprises: before performing the equivalent join on the left table and the right table by means of the hash join, adding a row location information column in the columnar storage engine to the left table for recording location information of each row of the left table;

performing the equivalent join on the left table and the right table in the two data tables by means of the hash join, and acquiring the first associated data of the association between the left table and the right table comprises:

performing an equivalent join on the left table and the right table after the row location information column is added by means of the hash join, so as to acquire the first associated data.

12. The method of claim 1, wherein the predetermined data structure comprises a first sub-data structure and a second sub-data structure; correspondingly, identifying, according to the target join type of the two data tables, location information of the second associated data in the left table and/or location information of the second associated data in the hash table corresponding to the right table in the predetermined data structure comprises:

recording information about offset positions of respective pieces of the second associated data in the hash table by using the first sub-data structure; and recording element location information of respective pieces of the second associated data in corresponding offset positions by using the second sub-data structure.

13. An electronic device, comprising:

at least one processing unit; and at least one memory coupled to the at least one processing unit and storing instructions to be executed by the at least one processing unit, the instructions, when executed by the at least one processing unit, causing the electronic device to perform acts comprising:

performing, by the electronic device, based on a hash table corresponding to a right table of two data tables stored in a columnar storage engine, an equivalent join on a left table of the two data tables and the right table by means of a hash join, and acquiring first associated data of an association between the left table and the right table;

filtering the first associated data according to a predetermined non-equivalent filtering condition, and determining second associated data satisfying the predetermined non-equivalent filtering condition in the first associated data;

identifying, according to a target join type of the two data tables, location information of the second associated data in the left table and/or location information of the second associated data in the hash table corresponding to the right table in a predetermined data structure stored in the columnar storage engine, wherein identifying location information of the second associated data in the hash table corresponding to the right table comprises: identifying information of an offset position corresponding to the second associated data in the hash table and the element position information corresponding to the offset position respectively, and/or wherein identifying location information of the second associated data in the left table comprises: recording location information of the first associated data in the left table when an equivalent join is performed and recording a determining result indicating whether the first associated data meets the predetermined non-equivalent filtering condition when non-equivalent filtering is performed; and generating a target joined table by processing the left table and/or the right table according to the target join type of the two data tables and the predetermined data structure.

14. The electronic device of claim 13, wherein the acts further comprise:

constructing a data structure corresponding to the hash table, the data structure being used for recording usage state information about respective elements comprised in respective offset positions of the hash table, wherein any offset position of the hash table comprises at least one element, and one of the at least elements corresponds to a row of data in the right table;

the method further comprises: after the identifying, in the predetermined data structure, the location information of the second associated data in the hash table corresponding to the right table, modifying, according to the location information of the second associated data in the hash table, usage state information of an element of the second associated data in the data structure corresponding to the hash table.

15. The electronic device of claim 14, wherein generating the target joined table by processing the left table and/or the right table according to the target join type of the two data tables and the predetermined data structure comprises:

in response to determining that the target join type is a full join, determining data in the left table other than the second associated data as the data that is to be supplemented in the left table according to the location information, in the predetermined data structure, of the second associated data in the left table;

determining the data that is to be supplemented in the right table according to the data structure corresponding to the hash table; and generating a target joined table based on the second associated data, the data that is to be supplemented in the left table and the data that is to be supplemented in the right table.

16. The electronic device of claim 15, wherein the left table comprises at least two data blocks; correspondingly, determining data in the left table other than the second associated data as the data that is to be supplemented in the left table according to the location information, in the predetermined data structure, of the second associated data in the left table comprises:

for a predetermined data structure obtained after performing an equivalent join and filtering under a predetermined non-equivalent filtering condition on any data block of the left table, determining data in the data block other than the second associated data as the data that is to be supplemented in the left table according to the location information, in the predetermined data structure, of the second associated data in the left table;

determining the data that is to be supplemented in the right table according to the data structure corresponding to the hash table comprises:

for data structures corresponding to the hash table obtained after performing an equivalent join and filtering under a predetermined non-equivalent filtering condition on all data blocks of the left table, determining the data that is to be supplemented in the right table according to the data structure corresponding to the hash table.

17. The electronic device of claim 14, wherein generating the target joined table by processing the left table and/or the right table according to the target join type of the two data tables and the predetermined data structure comprises:

in response to determining that the target join type is a right outer join, determining the data to be supplemented in the right table according to the data structure corresponding to the hash table; generating the target joined table based on the second associated data and the data to be supplemented in the right table; or in response to determining that the target join type is a right anti join, determining data in the right table other than the second associated data according to the data structure corresponding to the hash table, and generating the target joined table according to the data in the right table other than the second associated data; or in response to determining that the target join type is a right half join, determining an element whose usage state information being first modified in the data structure corresponding to the hash table, and generating the target joined table according to the data corresponding to the element whose usage state information being first modified in the right table.

18. The electronic device of claim 13, wherein generating the target joined table by processing the left table and/or the right table according to the target join type of the two data tables and the predetermined data structure comprises:

in response to determining that the target join type is a left outer join, determining data in the left table other than the second associated data as the data to be supplemented in the left table according to the location information, in the predetermined data structure, of the second associated data in the left table; generating the target joined table based on the second associated data and the data to be supplemented in the left table; or in response to determining that the target join type is a left anti join, determining data in the left table other than the second associated data according to the location information, in the predetermined data structure, of the second associated data in the left table, and generating the target joined table according to the data in the left table other than the second associated data; or in response to determining that the target join type is a left half join, acquiring location information about each first occurrence from the location information, in the predetermined data structure, of the second associated data in the left table, and generating the target joined table according to data corresponding to the location information about each first occurrence in the left table.

19. The electronic device of claim 18, wherein the left table comprises at least two data blocks; correspondingly, in response to determining that the target join type is a left outer join, a left anti join or a left half join, the predetermined data structure is a predetermined data structure obtained after performing an equivalent join and filtering under a predetermined non-equivalent filtering condition on any data block of the left table.

20. A non-transitory computer readable storage medium having a computer program stored thereon, the computer program, when executed by a processor, implementing acts comprising:

performing, by an electronic device, based on a hash table corresponding to a right table of two data tables stored in a columnar storage engine, an equivalent join on a left table of the two data tables and the right table by means of a hash join, and acquiring first associated data of an association between the left table and the right table;

filtering the first associated data according to a predetermined non-equivalent filtering condition, and determining second associated data satisfying the predetermined non-equivalent filtering condition in the first associated data;

identifying, according to a target join type of the two data tables, location information of the second associated data in the left table and/or location information of the second associated data in the hash table corresponding to the right table in a predetermined data structure stored in the columnar storage engine, wherein identifying location information of the second associated data in the hash table corresponding to the right table comprises: identifying information of an offset position corresponding to the second associated data in the hash table and the element position information corresponding to the offset position respectively, and/or wherein identifying location information of the second associated data in the left table comprises: recording location information of the first associated data in the left table when an equivalent join is performed and recording a determining result indicating whether the first associated data meets the predetermined non-equivalent filtering condition when non-equivalent filtering is performed; and generating a target joined table by processing the left table and/or the right table according to the target join type of the two data tables and the predetermined data structure.

*   *   *   *   *